US008107789B2

(12) United States Patent
Hashimoto et al.

(10) Patent No.: US 8,107,789 B2
(45) Date of Patent: Jan. 31, 2012

(54) PLAYBACK APPARATUS THAT READS DATA REPLACING DATA RECORDED ON RECORDING MEDIUM FROM ANOTHER RECORDING MEDIUM AND PLAYS BACK READ DATA, PLAYBACK METHOD, AND NON-TRANSITORY RECORDING MEDIUM

(75) Inventors: Satoshi Hashimoto, Lawrenceville, NJ (US); Hidetaka Ohto, Hyogo (JP); Keiichi Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 1275 days.

(21) Appl. No.: 11/571,955

(22) PCT Filed: Jul. 21, 2005

(86) PCT No.: PCT/JP2005/013418
§ 371 (c)(1),
(2), (4) Date: Mar. 6, 2007

(87) PCT Pub. No.: WO2006/009221
PCT Pub. Date: Jan. 26, 2006

(65) Prior Publication Data
US 2008/0031601 A1     Feb. 7, 2008

(30) Foreign Application Priority Data

Jul. 22, 2004  (JP) ................................. 2004-214917
Dec. 24, 2004  (JP) ................................. 2004-374643

(51) Int. Cl.
*H04N 9/80* (2006.01)
(52) U.S. Cl. ...................................... 386/248
(58) Field of Classification Search .................. 386/240, 386/248
See application file for complete search history.

(56) References Cited

U.S. PATENT DOCUMENTS 7,639,923 B2 * 12/2009 Ikeda et al. .................... 386/335
(Continued)

FOREIGN PATENT DOCUMENTS

EP          1580658      * 10/2003
(Continued)

OTHER PUBLICATIONS

English language Abstract of JP 10-293707, Nov. 1998.
(Continued)

*Primary Examiner* — David Harvey
(74) *Attorney, Agent, or Firm* — Greenblum & Bernstein, P.L.C.

(57) ABSTRACT

The present invention is the playback apparatus 400 for (i) mounting thereon the BD-ROM 200 in which a plurality of data groups and an application program that refers to each of the data groups are stored and (ii) playing back each of the data groups by executing the application program. The playback apparatus 400 comprises: the playback processing unit 412 operable to control the execution of the application program; the network IF unit 419 operable to obtain, from an external server including therein one or more alternative data groups, an alternative data group to replace part of the data groups; and the HDD unit 418 that stores therein correspondence information showing a correspondence between a storage location where on an internal recording medium the alternative data group is stored and a storage location where on the external recording medium the part of the data groups to be replaced. Here, at a time when the application program in execution reads a data group being referred to, the playback processing unit 412 (i) judges based on the correspondence information whether an alternative data group for replacing the data group being referred to exists on the internal recording medium, and (ii) specifies, as a data retrieve destination, a storage location of the alternative data group indicated by the correspondence information when the judgment is affirmative.

9 Claims, 30 Drawing Sheets

U.S. PATENT DOCUMENTS

| | | | |
|---|---|---|---|
| 2001/0006771 | A1 | 7/2001 | Kajiyama et al. |
| 2004/0255236 | A1 | 12/2004 | Collart |
| 2005/0044481 | A1 | 2/2005 | Collart |
| 2005/0141879 | A1 | 6/2005 | Chung et al. |
| 2005/0152681 | A1* | 7/2005 | Jung et al. ............ 386/95 |
| 2006/0098936 | A1 | 5/2006 | Ikeda et al. |
| 2007/0094505 | A1 | 4/2007 | Futa et al. |
| 2007/0172199 | A1 | 7/2007 | Kobayashi et al. |
| 2007/0274180 | A1 | 11/2007 | Kato et al. |
| 2010/0046923 | A1 | 2/2010 | Ikeda et al. |
| 2010/0046924 | A1 | 2/2010 | Ikeda et al. |

FOREIGN PATENT DOCUMENTS

| | | |
|---|---|---|
| EP | 1513152 | 3/2005 |
| EP | 1551027 | 7/2005 |
| EP | 1553769 | 7/2005 |
| EP | 1612990 | 1/2006 |
| EP | 1688950 | 8/2006 |
| EP | 1718074 | 11/2006 |
| JP | 5-324440 | 12/1993 |
| JP | 10-154380 | 6/1998 |
| JP | 10-293707 | 11/1998 |
| JP | 11-339385 | 12/1999 |
| JP | 2000-348446 | 12/2000 |
| JP | 2001-298725 | 10/2001 |
| JP | 2002-157227 | 5/2002 |
| JP | 2004-79134 | 3/2004 |
| WO | 00/63916 | 10/2000 |
| WO | WO 2004/030356 * | 4/2004 |
| WO | 2005/045834 | 5/2005 |

OTHER PUBLICATIONS

English language Abstract of JP 2001-298725, Oct. 2001.
English language Abstract of JP 11-339385., Dec. 1999.
English language Abstract of JP 2002-157227, May 2002.
English language Abstract of JP 2004-79134, Mar. 2004.
English language Abstract of JP 5-324440, Dec. 1993.
English language Abstract of JP 2000-348446, Dec. 2000.
English language Abstract of JP 10-154380, Jun. 1998.
U.S. Appl. No. 11/568,555 to Hashimoto et al., which was filed on Nov. 1, 2006.

* cited by examiner

FIG. 8

| FILE PATH OF TARGET CONSTITUENT FILE | DISCID | CONTENTID | ERROR FLAG | ERROR INFORMATION |
|---|---|---|---|---|
| BDVIDEO/001.PROG BDVIDEO/001.PL | 0x000C | KOREAN | FALSE | — |
| BDVIDEO/002.PROG BDVIDEO/002.PL | 0x000C | FRENCH | TRUE | INVALID X'X'X'.PL DETECTED |
| BDVIDEO/003.PROG BDVIDEO/003.PL | 0x00CA | EXTRA | FALSE | — |
| ... | ... | ... | ... | ... |

FIG. 17

| NAME OF CONSTITUENT FILE | FILE SIZE |
|---|---|
| 01000.m2ts | 103,897,323 |
| 01000.mpls | 161,704 |
| . . . . | . . . . |

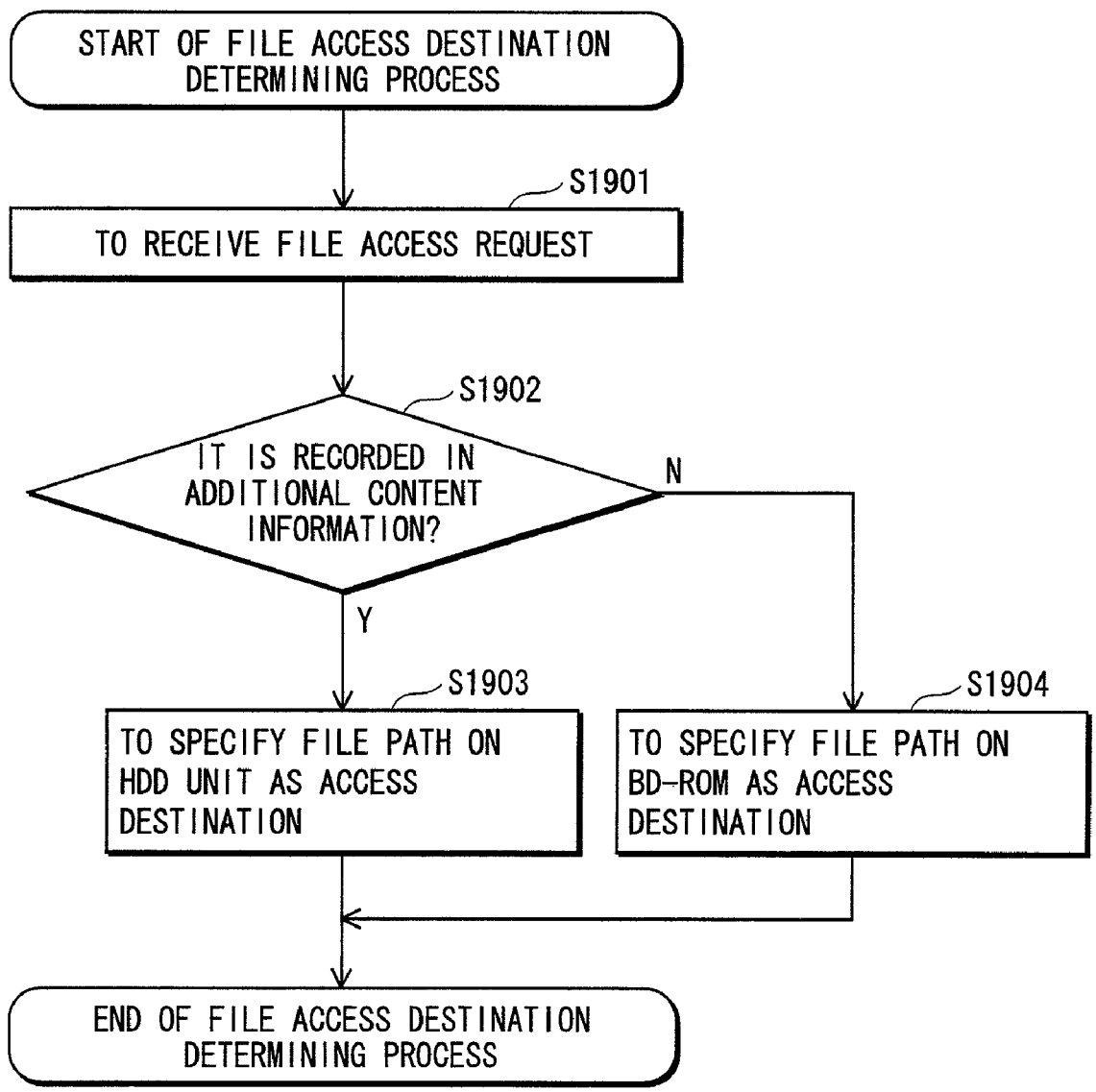

FIG. 20

| FILE PATH OF TARGET CONSTITUENT FILE | DISCID | CONTENT ID | NORMAL CONTENT ID | ERROR FLAG | ERROR INFORMATION |
|---|---|---|---|---|---|
| BDVIDEO/XXX.PROG BDVIDEO/XXX.PL ... | 0x000C | KOREAN_200607171700 | KOREAN_200607161700 | FALSE | — |
| BDVIDEO/XXX.PROG BDVIDEO/XXX.PL ... | 0x000C | KOREAN_200607192100 | KOREAN_200607171700 | FALSE | — |
| BDVIDEO/WWW.PROG BDVIDEO/WWW.PL ... | 0x000C | FRENCH_200607201530 | — | FALSE | — |
| BDVIDEO/WWW.PROG BDVIDEO/WWW.PL ... | 0x000C | FRENCH_200607211900 | FRENCH_200607201530 | TRUE | INVALID X'X'X'.PL DETECTED |
| BDVIDEO/EEE.PROG BDVIDEO/EEE.PL ... | 0x00CA | EXTRA | — | UNKNOWN | — |
| ... | ... | ... | ... | ... | ... |

FIG. 24

ERROR HAS BEEN DETECTED IN ALTERNATIVE CONTENT. SELECT A CONTENT TO BE PLAYED BACK ALTERNATIVELY.

| discID | contentID |
|--------|-----------|
| 0×000C | 「FRENCH_200607211800」 |
| 0×000C | 「FRENCH_20060720 1530」 |
| ... | ... |

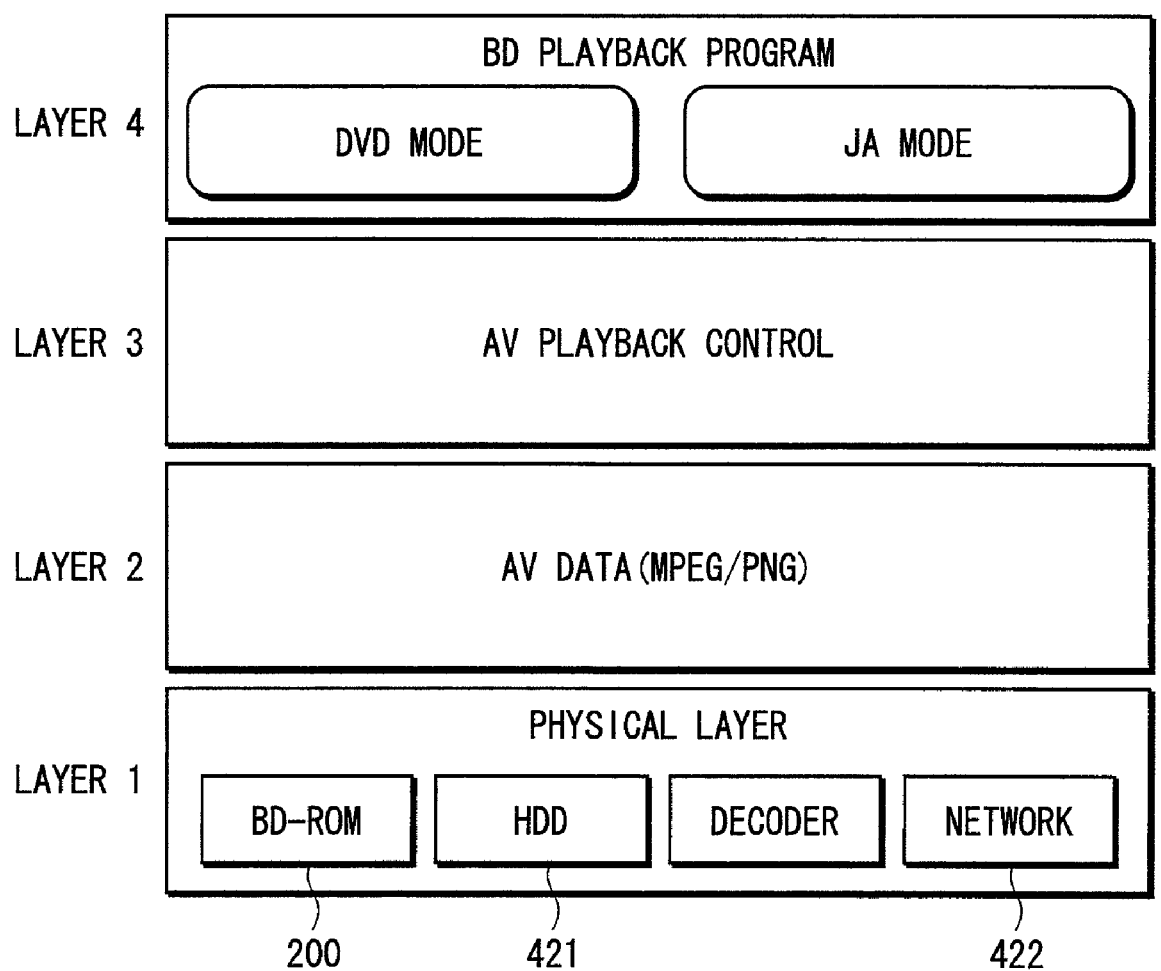

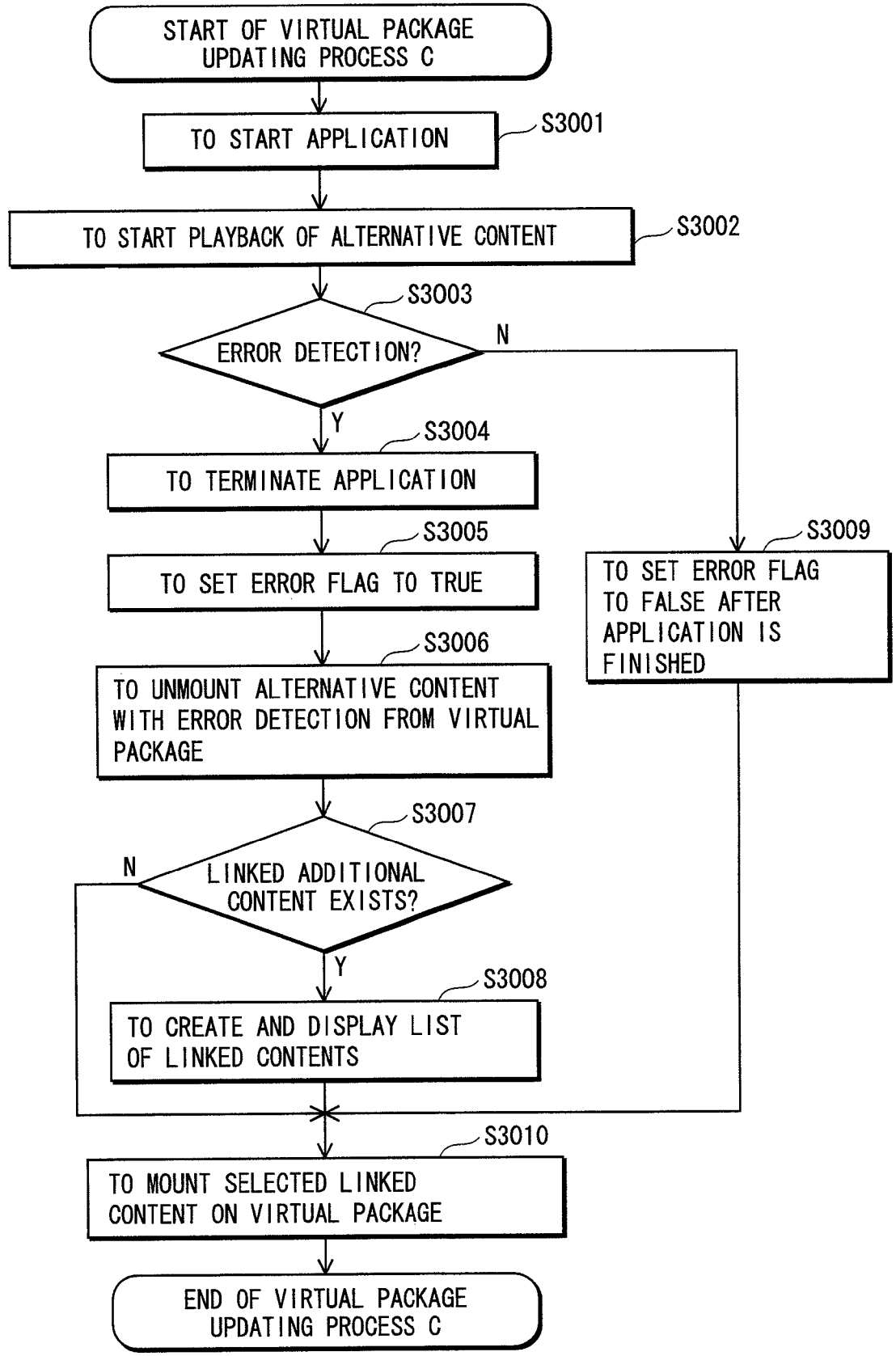

PLAYBACK APPARATUS THAT READS DATA REPLACING DATA RECORDED ON RECORDING MEDIUM FROM ANOTHER RECORDING MEDIUM AND PLAYS BACK READ DATA, PLAYBACK METHOD, AND NON-TRANSITORY RECORDING MEDIUM

TECHNICAL FIELD

The present invention relates to a playback apparatus and a playback method for playing back data from a recording medium, such as a BD-ROM, in particular to technology for reducing the occurrence of errors arose at the time of the data playback.

BACKGROUND ART

As to DVDs and other recording media, it is sometimes the case that reading errors occur due to scratches on the recording media. Accordingly, playback apparatuses on which such recording media are used generally have a function to detect errors in data when reading the data and correct the detected errors.

Patent Reference 1 discloses a method for efficiently detecting and correcting such data errors on the playback apparatuses.

Specifically speaking, according to the disclosed method, error detection information generated when data was first read is used at the time of reading the data once again, and then only portions in which errors were detected are reread while portions without errors are not subjected to the rereading process.

Herewith, the likelihood that the reread data also includes uncorrectable errors can be reduced, and the data rereading can be conducted in an efficient manner.
<Patent Reference 1> Japanese Laid-Open Patent Application 2000-348446

DISCLOSURE OF THE INVENTION

Problems that the Invention is to Solve

However, the conventional technology needs to, in the case when a detected error is attributable to data recorded on a read-only recording medium, obtain new data that is alternative to data with the error and to play back the alternative data.

Here, in the case where the data with an error is referred to by a program recorded on the read-only recording medium, the reference relationship is fixed. Therefore, a problem occurs that the program cannot be caused to refer to alternative data simply by obtaining the alternative data of the data having an error.

The present invention has been made in view of the above problem, and aims at offering a playback apparatus and a method capable of, even if a part of data referred to by a program recorded on a recording medium is recorded on another recording medium, reading the partial data from the other recording medium and playing this back with no trouble.

Means to Solve the Problem

The present invention is a playback apparatus for (i) mounting thereon an external recording medium in which a plurality of data groups and an application program that refers to each of the data groups are stored and (ii) playing back each of the data groups by executing the application program. The playback apparatus comprises: a control unit operable to control the execution of the application program; an obtaining unit operable to obtain, from an external server including therein one or more alternative data groups, an alternative data group to replace part of the data groups; and a storage unit that stores therein correspondence information showing a correspondence between a storage location where on an internal recording medium the alternative data group is stored and a storage location where on the external recording medium the part of the data groups to be replaced is stored. Here, at a time when the application program in execution reads a data group being referred to, the control unit (i) judges based on the correspondence information whether an alternative data group for replacing the data group being referred to exists on the internal recording medium, and (ii) specifies, when the judgment is affirmative, a storage location of the alternative data group indicated by the correspondence information as a data retrieve destination.

The present invention may also be a playback method used on a playback apparatus for (i) mounting thereon an external recording medium in which a plurality of data groups and an application program that refers to each of the data groups are stored and (ii) playing back each of the data groups by executing the application program. Here, the playback apparatus includes a storage unit storing therein correspondence information showing a correspondence between a storage location where on an internal recording medium the alternative data group is stored and a storage location where on the external recording medium part of the data groups to be replaced is stored. The playback method comprises: a control step of controlling the execution of the application program; and an obtaining step of obtaining, from an external server including therein one or more alternative data groups, an alternative data group to replace the part of the data groups. At the time when the application program in execution reads a data group being referred to, the control step (i) judges based on the correspondence information whether an alternative data group for replacing the data group being referred to exists on the internal recording medium, and (ii) specifies, when the judgment is affirmative, a storage location of the alternative data group indicated by the correspondence information as a data retrieve destination.

The present invention may also be A program for causing a playback apparatus, which mounts thereon an external recording medium storing a plurality of data groups and an application program that refers to each of the data groups, to perform a playback process of playing back each of the data groups by executing the application program. Here, the playback apparatus includes a storage unit storing therein correspondence information showing a correspondence between a storage location where on an internal recording medium the alternative data group is stored and a storage location where on the external recording medium part of the data groups to be replaced is stored. The playback process comprises: a control step of controlling the execution of the application program; and an obtaining step of obtaining, from an external server including therein one or more alternative data groups, an alternative data group to replace the part of the data groups. At the time when the application program in execution reads a data group being referred to, the control step (i) judges based on the correspondence information whether an alternative data group for replacing the data group being referred to exists on the internal recording medium, and (ii) specifies, when the judgment is affirmative, a storage location of the alternative data group indicated by the correspondence information as a data retrieve destination.

The present invention may also be A computer-readable recording medium that records a program for causing a playback apparatus, which mounts thereon an external recording medium storing a plurality of data groups and an application program that refers to each of the data groups, to perform a playback process of playing back each of the data groups by executing the application program. Here, the playback apparatus includes a storage unit storing therein correspondence information showing a correspondence between a storage location where on an internal recording medium the alternative data group is stored and a storage location where on the external recording medium part of the data groups to be replaced is stored. The playback method comprises: a control step of controlling the execution of the application program; and an obtaining step of obtaining, from an external server including therein one or more alternative data groups, an alternative data group to replace the part of the data groups. At the time when the application program in execution reads a data group being referred to, the control step (i) judges based on the correspondence information whether an alternative data group for replacing the data group of the reference destination exists on the internal recording medium, and (ii) specifies, when the judgment is affirmative, a storage location of the alternative data group indicated by the correspondence information as a data retrieve destination.

Advantageous Effects of the Invention

According to the above configuration, even when a part of the data being referred to by the application program recorded on the recording medium is recorded on a different recording medium, the present invention allows the application program to read the part of the data from the different recording medium and to play it. Accordingly, even if a playback error occurs in a part of the data recorded on the recording medium, the error data on the recording medium can be remedied by obtaining alternative data from a server of the data provider and playing back the alternative data while changing the reference destination of the alternative data.

Here, The playback apparatus may further comprise: an error detection unit operable to detect an error in the obtained alternative data group. Here, the control unit makes the affirmative judgment in the case where a storage location of the data group being referred to is shown in the correspondence information and no error is detected in the alternative data group used for replacement of the content being referred to.

Accordingly, alternative data in which an error has been detected at the time of acquisition will not be an access target of the application program, which prevents occurrence of an error during playback of alternative data.

Here, the playback apparatus may further comprise: a playback error detection unit operable to detect a playback error in the alternative data group, the playback error being an error occurring during playback of the obtained alternative data group. Here, the control unit makes the affirmative judgment in the case where the storage location of the data group being referred to is shown in the correspondence information and no playback error is detected in the alternative data group used for replacement of the content being referred to.

Accordingly, alternative data in which an error has been detected during playback of the alternative data is subsequently eliminated from access targets of the application program. As a result, this prevents repeating accesses to the alternative data having a playback error and avoids resultant occurrences of playback errors.

Here, the alternative data groups may be sequentially updated, and the correspondence information may include therein information indicating a type of each of the updated alternative data groups and an update timing. In this case, the obtaining unit sequentially obtains, from the external server, the updated alternative data groups and the correspondence information of each of the updated alternative data groups. The storage unit stores therein the correspondence information obtained sequentially. In the case when the judgment is affirmative and there are two or more storage locations for the alternative data group corresponding to the data group being referred to, the control unit specifies a storage location having a latest updating timing as the data retrieve destination.

Accordingly, even when the obtained alternative data includes an error and therefore cannot be used, the present invention allows the use of alternative data having the latest update timing in place of the obtained alternative data, which prevents occurrence of alternative data being unable to be played back.

Here, the alternative data groups may be sequentially updated, and the correspondence information may include therein information indicating a type of each of the updated alternative data groups and an update timing. In this case, the obtaining unit sequentially obtains, from the external server, the updated alternative data groups and the correspondence information of each of the updated alternative data groups. The storage unit stores therein the correspondence information obtained sequentially. The playback apparatus further comprises: an adding unit operable to add, in the correspondence information, normal operation information to each alternative data group in which no playback error is detected, the normal operation information indicating the detection of no playback error and being associated with a storage location of the alternative data group; a selection list display unit operable to display, in a case when a playback error is detected in a newly obtained alternative data group, a list showing at least one storage location of an alternative data group having (i) the same type as the newly obtained alternative data group and (ii) the normal operation information added thereto, based on the correspondence information; and an instruction reception unit operable to receive a selection instruction for selecting a storage location of the alternative data group from the list. In the case when the judgment is affirmative and the data group being referred to is a data group replaced with the alternative data group of the selection instruction, the control unit specifies the storage location of the alternative data for the selection instruction as a data retrieve destination.

Accordingly, even when a playback error occurs in alternative data, the present invention is capable of selecting, from among other alternative data which has been confirmed to operate normally, substitute alternative data and playing back this, which effectively prevents alternative data from becoming unable to be played back as well as avoids recurrence of errors.

Here, the data groups respectively may have contents of different types, and the alternative data group may have a content of the same type as a content of the data group to be replaced. In this case, the playback apparatus further comprises: a playback error detection unit operable to detect a playback error in each of the contents of different types, the playback error being an error occurring during playback of each of the contents of different types; and an error content judgment unit operable to judge, when the playback error is detected, whether a content including the detected playback error is a predetermined type. When the content including the detected playback error is not the predetermined type, the control unit plays back the content of the predetermined type by executing the application program.

In addition, the content of the predetermined type may be a content for playing back a selection menu which allows selection of contents of other types that are playback targets.

Herewith, even if a playback error occurs in a given content, the selection menu screen is played back, and accordingly the user is able to select a different content having no playback error from the selection menu and play the content.

BRIEF DESCRIPTION OF THE DRAWINGS

FIG. 8 shows a specific example of additional content information;

FIG. 17 shows a specific example of file structure information;

FIG. 19 is a flowchart showing operations of a file access destination determining process performed by the virtual package management unit 503;

FIG. 20 shows a specific example of additional content information used in Embodiment 2;

FIG. 24 shows a specific example of a GUI display screen of a linked content list displayed on a TV 500;

FIG. 29 shows a software configuration on the playback apparatus 400; and

FIG. 30 is a flowchart showing operations of a virtual package updating process C performed by the JA playback processing unit 414.

Figure 1:
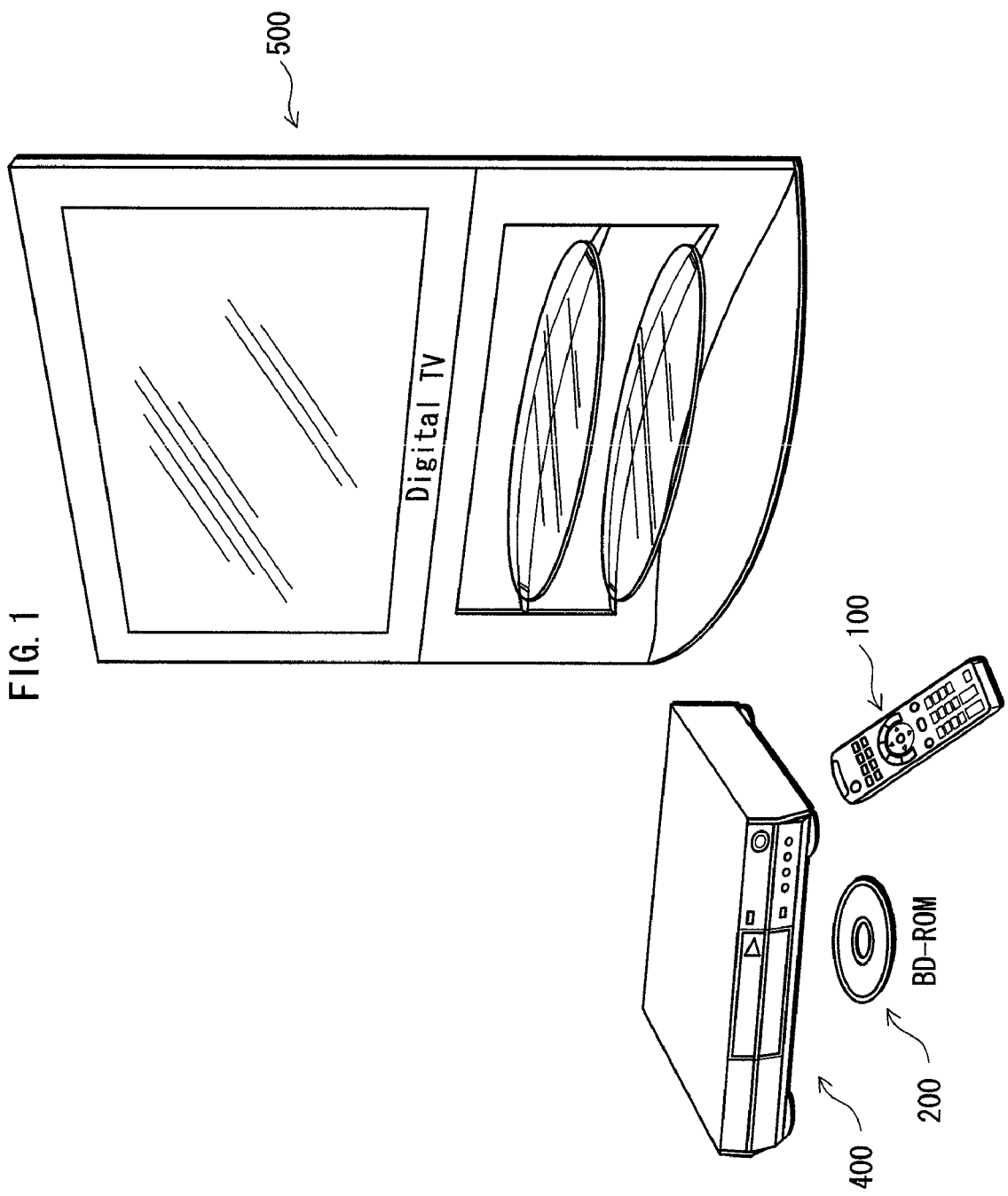
FIG. 1 shows a specific example of a usage application of a playback apparatus 400 according to the present invention.

EXPLANATION OF REFERENCES 100 remote controller
200 BD-ROM
400 playback apparatus
401 BD-ROM drive
402 track buffer
403 demultiplexer
404 video decoder
405 video plane
406 audio decoder
407 image memory
408 image plane
409 image decoder
410 adder
411 scenario memory
412 playback processing unit
413 DVD playback processing unit
414 JA playback processing unit
415 UO detection unit
416 mode management unit
417 playback control unit
418 HDD unit
419 network IF unit
500 TV
501 application execution unit
502 media playback unit
503 virtual package management unit
504 file management unit
505 network management unit
506 application management unit
701 playback error detection unit

BEST MODE FOR CARRYING OUT THE INVENTION

Embodiment 1

<Configuration>

FIG. 1 shows a specific example of a usage application of a playback apparatus 400 of the present invention. In this usage application, the playback apparatus 400 is a component of a home theater system, which is composed of a remote controller 100, a BD (Blue Ray Disk)-ROM 200, the playback apparatus 400, and a TV 500.

Figure 4:
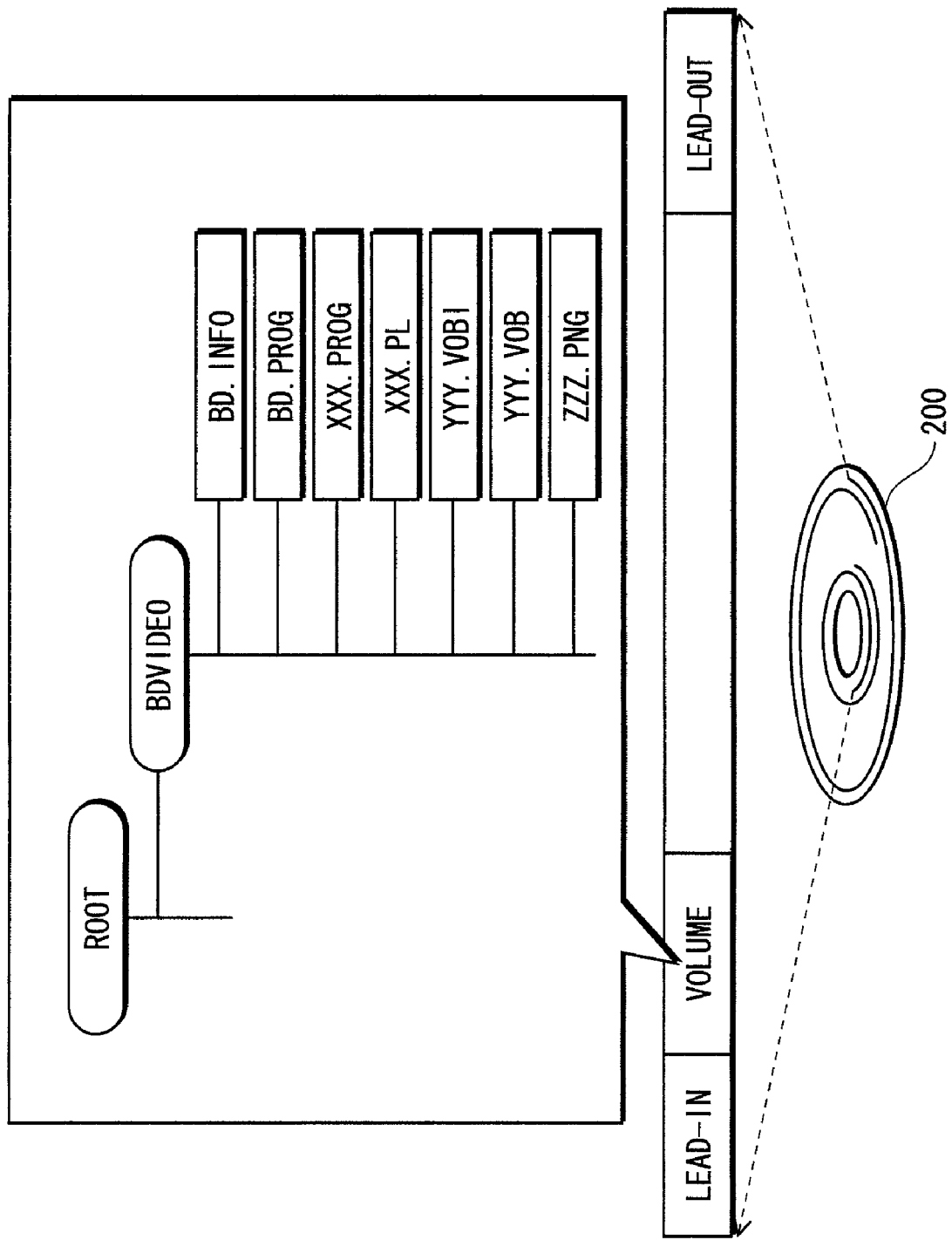
FIG. 4 shows an internal configuration of a BD-ROM 200.

FIG. 4 shows an internal configuration of the BD-ROM 200. FIG. 4 depicts the track in a laterally drawn-out form, although the track is, in fact, formed in a spiral, winding from the inside toward the outside of the BD-ROM 200.

The track is composed of a lead-in area, a volume area, and a lead-out area. The volume area is made up of a physical layer, a filesystem layer, and an application layer, and FIG. 4 shows a format of the application layer by using a directory structure.

BDVIDEO directory located under Root directory in FIG. 4 is a directory storing therein AV contents, management information, and the like.

BD.INFO located under BDVIDEO directory is management information related to the entire BD-ROM 200, and the management information includes information, such as an Organization ID that is an identifier for identifying a provider of a movie, and a discID and contentIDs that are provided by the provider.

Here, the "discID" is an identifier assigned to each BD-ROM provided by a provider.

"contentID" is a content identifier attached to each content provided by a provider. Based on a contentID, a server of the provider identifies file paths of a group of files that constitute the content.

BD.INFO includes a management table showing correspondence between multiple titles playable on the BD-ROM 200 and title ID information used to identify individual titles.

Here, the "title ID information" is information for associating a title with an application program used to play back a content indicated by the title as well as with a playlist (hereinafter, referred to as "PL") to which the application program refers in order to play back the content.

A "PL" is information defining a logical path for playing back individual elementary streams included in an AV clip—such as presentation graphic streams structuring video streams, audio streams and subtitles, and interactive graphics streams structuring GUI display screens and the like.

An "AV clip" is an elementary stream group which is an object for playback. AV clips are respectively stored in a file in units of a predetermined playback section.

Figure 3:
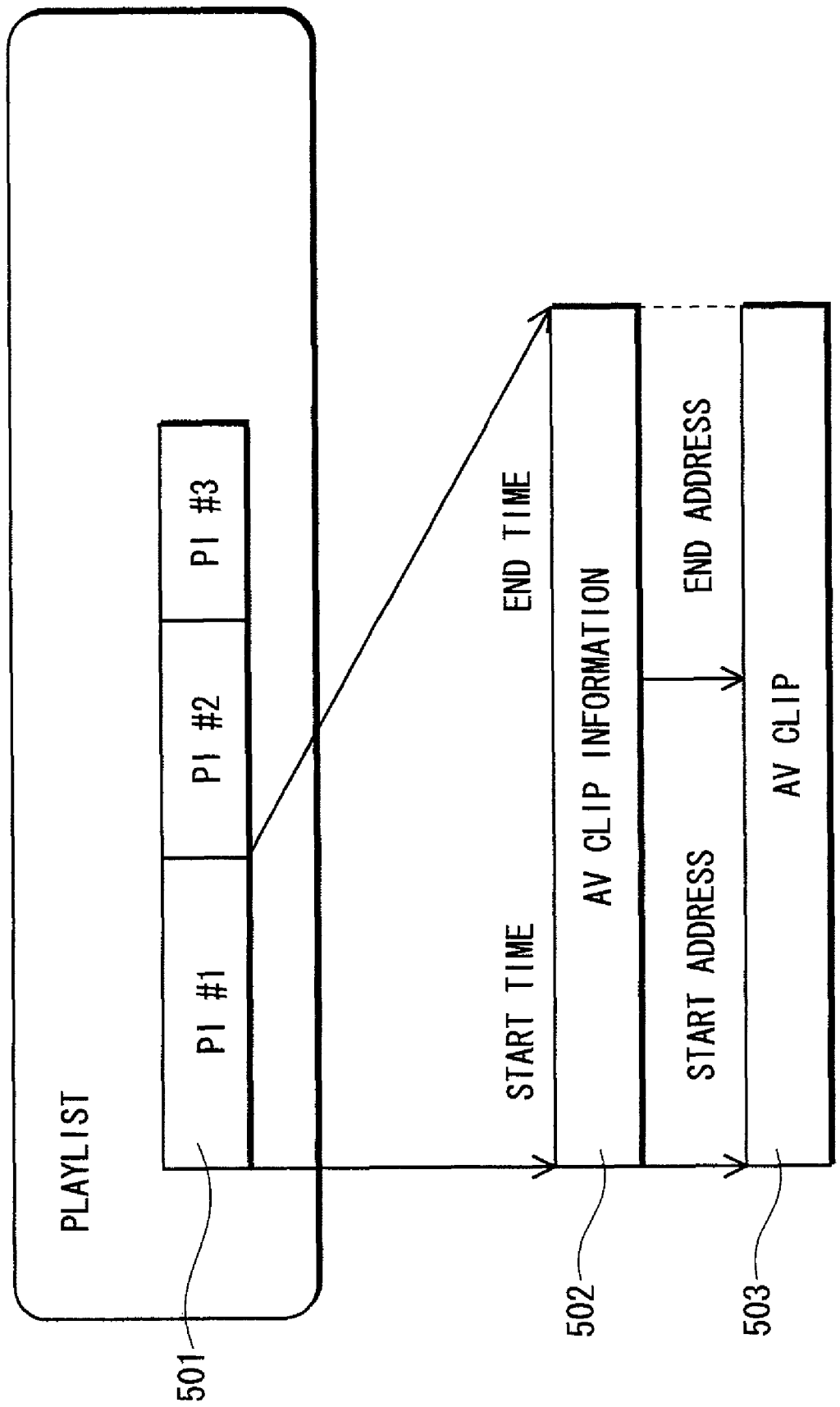
FIG. 3 shows a specific example of a PL.

FIG. 3 shows a specific example of a PL. 501 of FIG. 3 represents a play item (PI); 502, AV clip information; and 503, an AV clip.

As shown in FIG. 3, a PL is composed of one or more play items. Play items are individually identified by a play item number (indicated by # in FIG. 3), and arranged in an order to be played back in the PL.

Here, the "play item" is information including information indicating a corresponding AV clip and playback start and end times indicating a playback section of the AV clip.

AV clip information includes table information showing correspondence between the playback times and addresses indicating storage locations of elementary streams. Storage locations of elementary streams of an AV clip can be determined based on playback start and end times indicated by a play item and the table information.

BD.PROG located under BDVIDEO directory is one of the BD playback programs, and is a file for storing programs related to the entire BD-ROM 200.

XXX.PROG located under BDVIDEO directory is a file for storing individual programs used to play back corresponding AV clips in a playback procedure indicated by a PL.

Here, "XXX" is a variable character string and "PROG" is a fixed character string.

XXX.PL located under BDVIDEO directory is a file for storing PLs.

This file is associated with "XXX.PROG" by having the same variable character string.

YYY.VOBI located under BDVIDEO directory is a file for storing AV clip information.

Here, "YYY" is a variable character string and "PROG" is a fixed character string.

YYY.VOB located under BDVIDEO directory is a file for storing AV clips corresponding to the AV clip information above.

This file is associated with "YYY.VOBI" by having the same variable character string.

ZZZ.PNG located under BDVIDEO directory is a file for storing AV clips including PNG (Portable Network Graphics), which is image data used for structuring subtitles and menus.

FIG. 29 shows a software configuration of the playback apparatus 400. Layer 1 is a physical layer, in which controls on hardware, such as the BD-ROM 200, hard disks (HDD), decoders, and network devices, are performed.

Layer 2 is a layer that defines a decoding format of AV clips.

Layer 3 is a layer for controlling playback of AV clips.

Layer 4 is for realizing switch control between DVD mode in which mainly main contents (e.g. movies) recorded on the BD-ROM 200 are played back and Java mode (Java is a registered trade mark, and hereinafter referred to as "JA") in which additional contents (e.g. subtitles of movies and animation display) to be played back with main contents are played back.

Figure 28A:
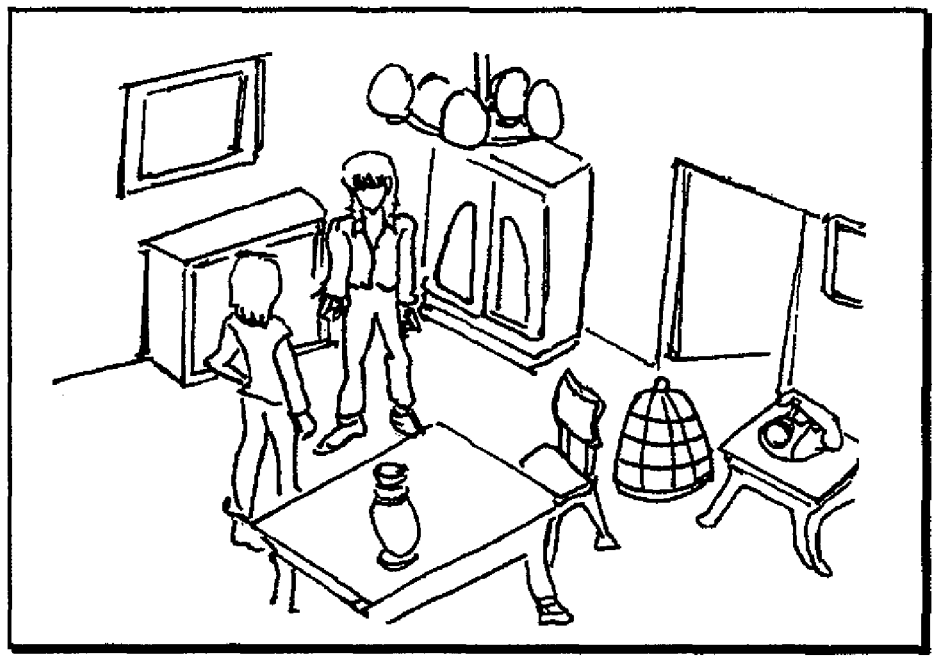
FIG. 28 shows specific examples of videos played back in JA mode and DVD mode, respectively.
Figure 28B:

FIG. 28 shows specific examples of videos played back in these modes. FIG. 28A shows a video played back in DVD mode; and FIG. 28B shows a video played back in both DVD and JA modes.

Figure 2:
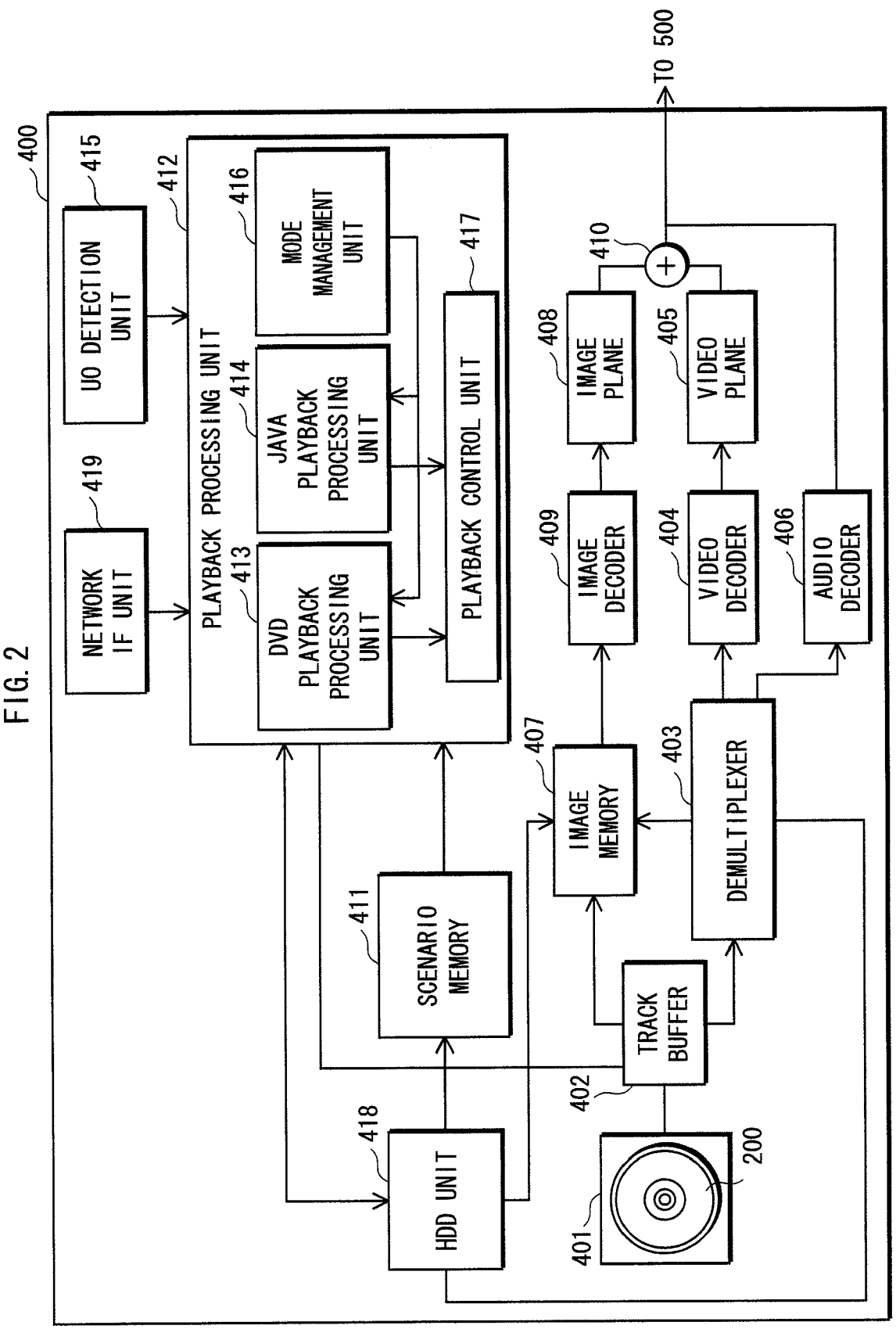
FIG. 2 is a functional block diagram showing a configuration of the data playback apparatus 400.

FIG. 2 is a functional block diagram showing a configuration of the data playback apparatus 400 according to the present embodiment.

The data playback apparatus 400 comprises: a BD-ROM drive 401; a track buffer 402; a demultiplexer 403; a video decoder 404; a video plane 405; an audio decoder 406; an image memory 407; an image plane 408; an image decoder 409; an adder 410; a scenario memory 411; a playback processing unit 412; a UO detection unit 415; a HDD unit 418; and a network IF unit 419.

BD-ROM Drive 401

The BD-ROM drive 401 performs loading/ejecting of the BD-ROM 200, and accesses the loaded BD-ROM 200 to read various data, including AV clips, recorded on the BD-ROM 200.

Track Buffer 402

The track buffer 2 is a FIFO memory that stores individual access units of video streams, audio streams, sub-video streams, and navigation button information included in AV clips sequentially read from the BD-ROM 200 and outputs the access units to the demultiplexer 403 and image memory 407 on a first-in first-out basis.

Here, the "sub-video streams" are streams including character data used to generate subtitles displayed with videos and images for various menu screens.

The "navigation button information" is information for generating operation buttons displayed in GUI (Graphic User Interface).

Demultiplexer 403

The demultiplexer 403 demultiplexes access units of video and audio streams input from the track buffer 402 to obtain video frames constituting GoPs and audio frames, then outputs the video frames to the video decoder 404 while outputting the audio frames to the audio decoders 406.

In addition, the demultiplexer 403 stores, in the image memory 407, sub-video streams input from the track buffer 407 and HDD unit 418, while storing the navigation button information in the scenario memory 411.

Note that the above demultiplexing includes a conversion process that converts TS packets into PES packets.

Video Decoder 404

The video decoder 404 decodes video frames input from the demultiplexer 403 and writes pictures in an uncompressed format on the video plane 405.

Video Plane 405

The picture plane 5 stores uncompressed-format pictures decoded by the video decoder 404.

Audio Decoder 406

The audio decoder 406 decodes audio frames input from the demultiplexer 403 and outputs audio data in an uncompressed format to the TV 500.

Image Memory 407

The image memory 407 stores sub-video streams and navigation button information.

Image Plane 408

The image plane 408 is a memory having a single screen capacity area and stores therein sub-video streams and navigation button information decoded by the image decoder 409.

Image Decoder 409

The image decoder 409 decodes sub-video streams and navigation button information stored in the image storage unit 402 and writes them on the image plane 408.

By decoding sub-video streams, various menus and sub-videos appear on the screen of the TV 500.

Adder 410

The adder 410 combines an image stored in the image plane 408 with an uncompressed-format picture stored in the video plane 405, and outputs the combined video to the TV 500.

FIG. 28 shows a specific example of a screen with a composite video. FIG. 28A shows a screen with a video of only a picture stored in the video plane 405 and is yet to be combined; FIG. 28B shows a screen with a video after composition. FIG. 28B indicates that a video of a character, an owl, and a text video of "Adventure Game" have been composed with a video of the picture.

Scenario Memory 411

The scenario memory 411 stores therein a current playlist (hereinafter, referred to as "current PL") and current AV clip information.

Here, a "current PL" is, among multiple playlists (PLs) recorded on the BD-ROM 200, a PL currently targeted for processing.

Current AV clip information is, among multiple pieces of AV clip information recorded on the BD-ROM 200, a piece currently targeted for processing.

Playback Processing Unit 412

The playback processing unit 412 comprises: a DVD playback processing unit 413; a JA playback processing unit 414; a mode management unit 416; and a playback control unit 417.

DVD Playback Processing Unit 413

The playback processing unit 413 starts up, in accordance with a process instruction from the mode management unit 416, a scenario program which was input to the mode management unit 416 and corresponds to a user's selected title, obtains a PL associated with the scenario program, causes the scenario memory 411 to store the PL therein, and reads elementary streams of each AV clip from the BD-ROM 200 in accordance with the PL stored in the scenario memory 411 and plays back the elementary streams.

Here, the "scenario program" is a program used for playing back main contents (e.g. contents of an actual movie) recorded on the BD-ROM 200.

JA Playback Processing Unit 414

The JA playback processing unit 414 starts up, in accordance with a process instruction from the mode management unit 416, a JA application program which was input to the mode management unit 416 and corresponds to a user's selected title, obtains a PL associated with the started JA application program from the BD-ROM 200, causes the scenario memory 411 to store the PL therein, and reads elementary streams of each AV clip from the BD-ROM 200 in accordance with the PL stored in the scenario memory 411 and plays back the elementary streams.

The JA playback processing unit 414 comprises a CPU, a JA Virtual machine, configurations, profiles and the like. The JA playback processing unit 414 reads a class file for a JA application program from the BD-ROM 200, generates objects based on the read class file and executes the objects to thereby realize the above-mentioned function.

The JA Virtual machine converts objects written in the Java language into native codes, and causes the CPU to execute the native codes.

Mode Management Unit 416

According to a user's selected title (e.g. in the case where the main content recorded on the BD-ROM is a movie, the user can select a title from a title for "playback of the movie", a title for "preview of new movies", a title for "audio/subtitle settings") which is input via the UO detection unit 415, the mode management unit 416 refers to a process-mode selection table, determines a type of the process mode for the selected title—i.e. determines that the process mode should be processed by the DVD playback processing unit 413, or should be processed by the JA playback processing unit 414. Then, the mode management unit 416 issues a process instruction to a playback processing unit which handles the determined process mode.

Note that, when the BD-ROM 200 is started or when an application program executing a title is finished, a predetermined title is automatically selected by the mode management unit 416, and a process instruction is issued in accordance with the selected title.

Here, the "process-mode selection table" is a table that shows correspondence between selected titles and their process modes, and is prestored in the mode management unit 416.

Playback Control Unit 417

The playback control unit 417 executes a playback process of AV clips by referring to PLs recorded in the scenario memory 411 in accordance with instructions from the DVD playback processing unit 413 and JA playback processing unit 414. Specifically speaking, the AV playback control unit 417 executes functions, which consist of a function group similar to that found in DVD and CD players, such as starting playback (Play); stopping playback (Stop); pausing (Pause-On); releasing a pause (Pause-Off); releasing a still (Still-Off); speed specified fast-forwarding (Forward Play (speed)); speed specified fast-rewinding (Backward Play (speed)); changing audio settings (Audio Change); changing subtitle settings (Subtitle Change); and changing angle settings (Angle Change).

Figure 7:
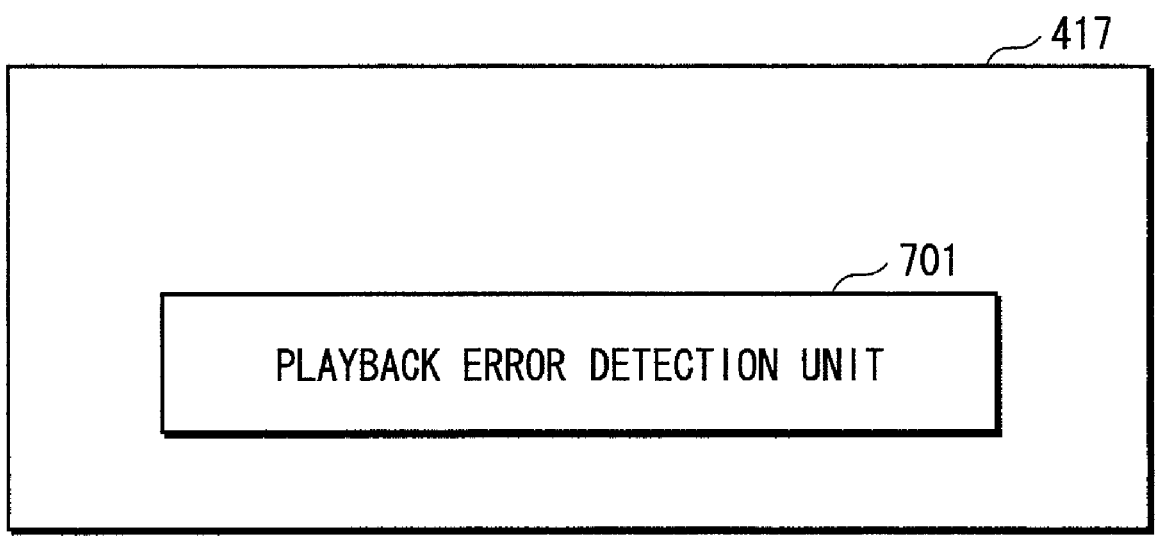
FIG. 7 shows a configuration of a playback control unit 417.

FIG. 7 shows a configuration of the playback control unit 417. The playback control unit 417 includes a playback error detection unit 701, and the playback error detection unit 701 perform detection of an error (e.g. an error due to file loss) on individual files constituting a content, which was instructed to be played back, and informs the JA playback processing unit 414 and DVD playback processing unit 413 of the occurrence of an error and the details (hereinafter, referred to as "file error information").

UO Detection Unit 415

The UO detection unit 415 receives a title selection instruction from the user via a remote controller 100 or an operation unit (not shown in the figure), and outputs the title selection instruction to the playback processing unit 412.

Network IF Unit 419

The network IF unit 419 makes connection to an external server in response to an instruction from the JA playback processing unit 414, downloads a requested file group from the external server, and outputs the file group to the JA playback processing unit 414.

The connection to an external server is realized, for example, by connecting to the Internet via ADSL (Asymmetric Digital Subscriber Line), a cable modem, or the like.

HDD Unit 418

The HDD unit 418 is structured with a magnetic recording medium, and stores therein file groups obtained from an external server via the network IF unit 419.

Configuration of JA Playback Processing Unit 414

Figure 5:
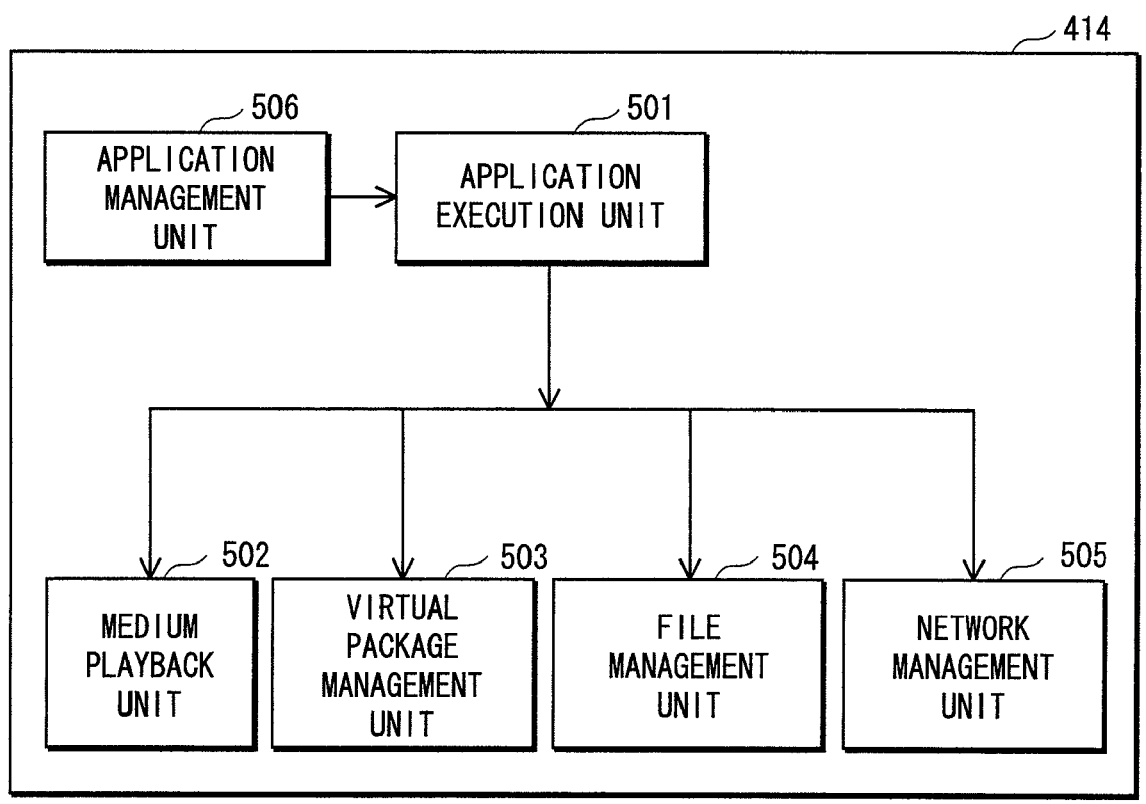
FIG. 5 is a functional block diagram showing a configuration of a JA playback processing unit 414.

The configuration of the JA playback processing unit 414 is described next in detail. FIG. 5 is a functional block diagram showing the configuration of the JA playback processing unit 414. The JA playback processing unit 414 comprises: an application execution unit 501; a medium playback unit 502; a virtual package management unit 503; a file management unit 504; a network management unit 505; and an application management unit 506.

Application Execution Unit 501

The application execution unit 501 executes a JA application program associated with each title.

Medium Playback Unit 502

In response to an instruction from the application execution unit 501, the medium playback unit 502 performs control so that the playback of each AV clip is executed in accordance with a PL that is associated with a JA application program in execution.

Specifically speaking, the medium playback unit 502 instructs the playback control unit 417 to execute a playback process of each AV clip according to the PL.

When file error information of an AV clip is sent from the playback control unit 417, the medium playback unit 502 requests the application management unit 506 to terminate the JA application program in execution, and then informs the file management unit 504 of a file with an error.

Virtual Package Management Unit 503

The virtual package management unit 503 executes a virtual package creating process in response to an instruction from the application execution unit 501.

Here, the "virtual package" is information obtained by extending volume management information of the BD-ROM 200.

The "volume management information" is information specifying a directory-file structure existing on the BD-ROM 200, and is composed of directory management information pertaining to directories and file management information pertaining to files.

The virtual package is created by adding new file management information to the volume management information of the BR-ROM 200 so as to change a directory-file structure of the BD-ROM 200.

Here, the "file management information" is file management information on file groups (PLs, AV clip information, AV clips, and the like) downloaded into the HDD unit 418. By creating a virtual package where such file management information has been added, the playback control unit 417 is able to recognize the presence of these file groups on the BD-ROM 200.

Specifically speaking, an application program (a JA application program, or a scenario program) in execution requests, via the playback control unit 417, a file access using a locater on the BD-ROM 200. In response to the request, the virtual package management unit 503 judges, based on additional content information to be hereinafter described, which one of the BD-ROM 200 and the HDD unit 418 an entity of the access requested file is recorded on.

When determining that the entity of the file is recorded on the HDD unit 418, the virtual package management unit 503 converts the access requested destination into a file path to, on the HDD unit 418, a file indicated by the additional content information.

Figure 6:
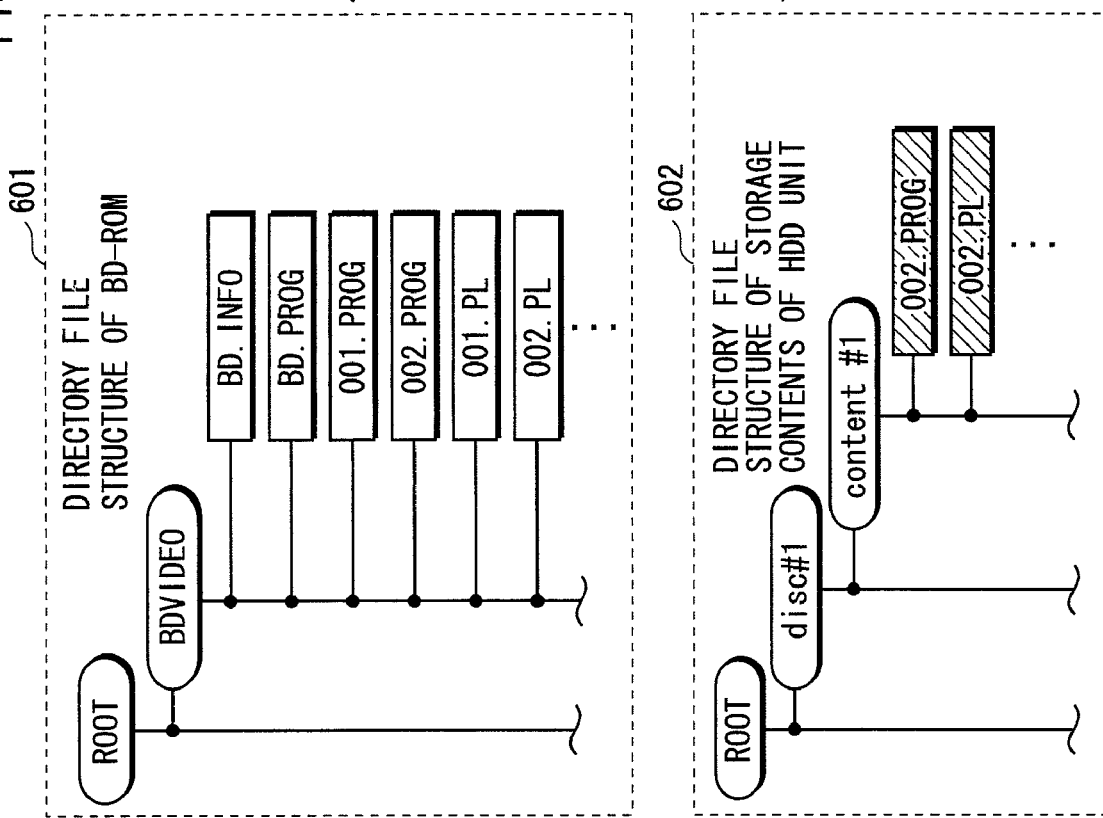
FIG. 6 shows an example of virtual package creation performed by a virtual package management unit 503.

FIG. 6 shows an example of virtual package creation performed by the virtual package management unit 503. 601 shows a directory-file structure of the BD-ROM 200; 602 shows a directory-file structure of storage contents of the HDD unit 418.

Directory File Structure of Storage Contents of HDD Unit

Adding the directory-file structure shown by 602 to the directory-file structure of the BD-ROM 200 creates the virtual package of the directory-file structure shown by 603.

"002.PROG" and "002.PL" marked with diagonal lines in 603 indicate that their file paths to the BD-ROM 200 have been converted into file paths to the HDD 418.

Note that, in the case where a file having the same file path as a file path in the virtual package is on the BD-ROM 200, the file management information of the HDD unit 418 in the volume management information is overwritten, and herewith the files of the HDD unit 418 are used preferentially in the virtual package.

The following describes a process of creating a virtual package in detail.

1. Download Request Process

When a title for the virtual package creation process is selected by the user, the virtual package management unit 503 informs, via the network management unit 505, an external server that manages files of the BD-ROM 200 about a contentID of a replacement-target content and a discID of the BD-ROM 200 specified by the user, and places a download request for a corresponding alternative content.

Here, the "replacement-target content" means, among contents recorded on the BD-ROM 200, a content specified by the user as a target for replacement. Examples of contents possibly specified as a replacement-target content among contents on the BD-ROM 200 are a content in which an error has been detected, and a content before update in the case where the content is updated periodically.

An alternative content provided by the external server may be a content including therein the same substance as the error detected file. Or in the case of having an almost same substance the error detected content, it may be an updated content of the error detected content or a pre-updated content of the error detected content. In addition, in the case when a pre-updated content is informed, its updated content is provided by the external server as an alternative content.

The virtual package management unit 503 may also place a request with the external server for download on a file basis, instead of a content basis. In this case, the virtual package management unit 503 informs the external server of a file path of the replacement-target file together with contentID when making the download request.

Here, the "replacement-target file" means, among files recorded on the BD-ROM 200, a file specified by the user as a replacement-target file.

Examples of files possibly specified as a replacement-target file among files on the BD-ROM 200 are a file in which an error has been detected, and a file before update in the case where the file is updated periodically.

An alternative file provided by the external server may be a file including therein the same substance as the error detected file. Or in the case of having an almost same substance as the error detected file, it may be an updated file of the error detected file or a pre-updated file of the error detected file. In addition, in the case when a pre-updated file is informed, its updated file is provided by the external server as an alternative file.

Figure 12:
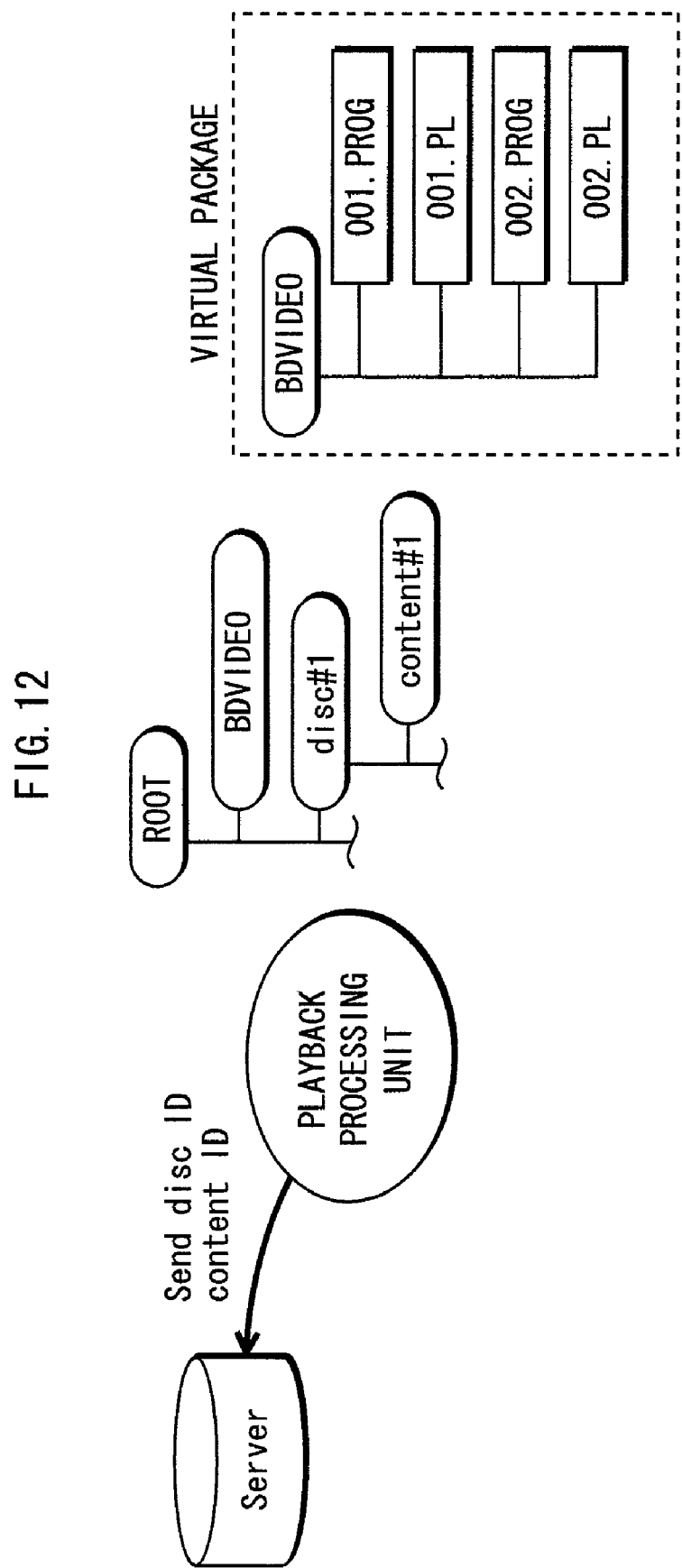
FIG. 12 shows a process that the virtual package management unit 503 places a download request with an external server, via a network management unit 505, in order to obtain a group of files constituting an alternative content.

FIG. 12 shows a process that the virtual package management unit 503 places a download request with the external server, via a network management unit 505, in order to obtain a group of files constituting an alternative content.

For the download, a communication protocol generally used on the Internet, such as HTTP or HTTPS, is employed.

2. Downloaded Content Recording Process

The following explains a process in which the virtual package management unit 503 records a file group downloaded from the external server.

Figure 13:
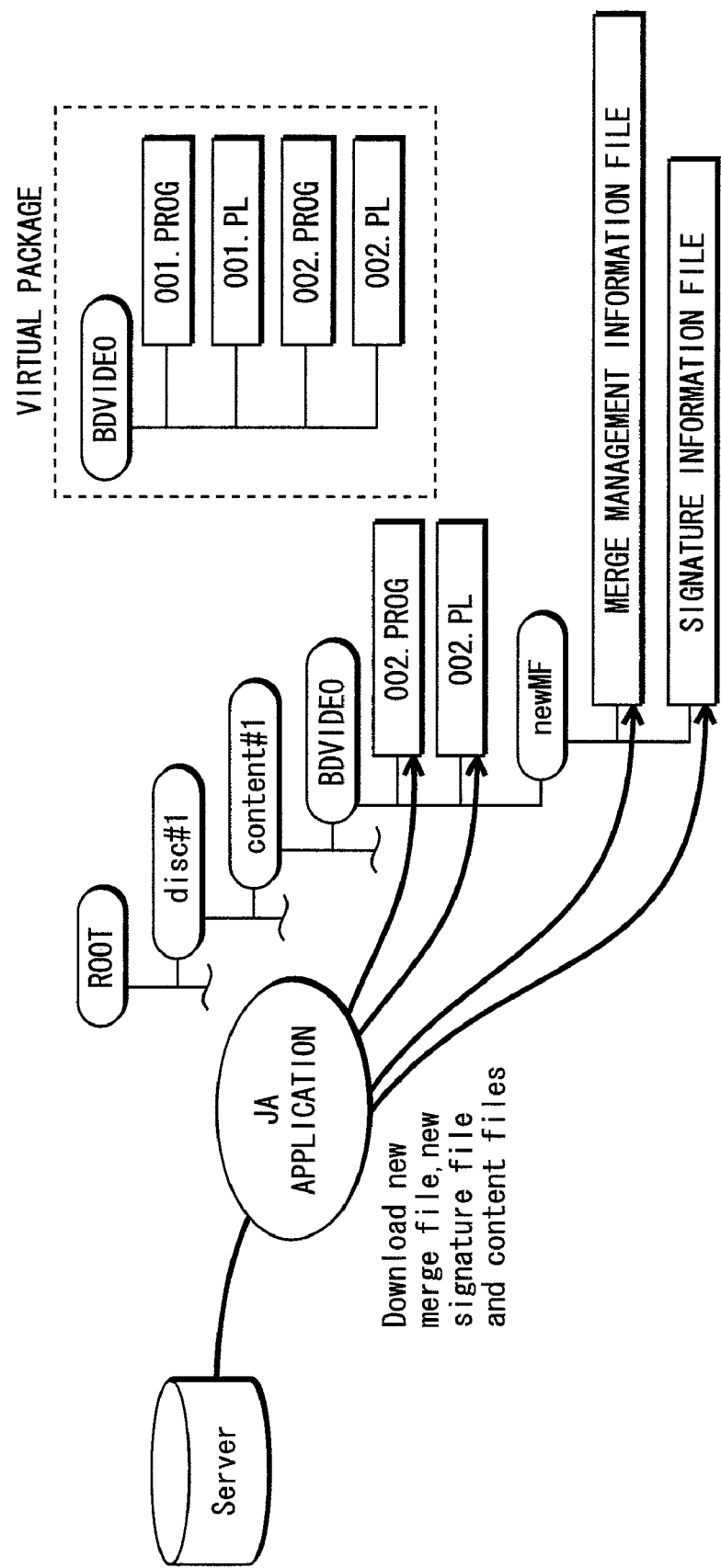
FIG. 13 shows a process that a JA application program records a group of constituent files of the alternative content downloaded from the external server on a HDD unit 418.

FIG. 13 shows a process that a JA application program records a constituent file group of the alternative content downloaded from the external server on the HDD unit 418.

When a merge management information file, a signature information file corresponding to the merge management information, an alternative content, file structure information of the alternative content are downloaded from the external server, the virtual package management unit 503 generates a new directory (newMF directory) under disc#1 directory, which corresponds to the discID. Then, the virtual package management unit 503 record—among a group of files constituting the alternative content (hereinafter, these files are referred to as "constituent files") sent from the server in response to a request—the merge management information file and the corresponding signature information file in the newly generated directory. In addition, a group of the constituent files is recorded in content#1 directory, which corresponds to the contentID, located under disc#1 directory.

Here, the "file structure information" means information indicating correspondence among a file name, a file size, a hash value, and a CRC value for each constituent file.

FIG. 17 shows a specific example of the file structure information. The file structure information of FIG. 17 pertains to the file size.

Note that the recording of the files here is realized by specifying a locator to the HDD unit 418 using an API provided by the file management unit 504.

Here, the "merge management information file" means a file for storing therein information indicating correspondence between individual files constituting a replacement-target content (hereinafter, these files are referred to as "target constituent files") and its alternative content (specifically speaking, correspondence between a file path that indicates a storage location of each target constituent file on the BD-ROM 200 and a file path that indicates a storage location on the HDD unit 418 and is made up of a discID, a contentID and a file path on the BD-ROM 200).

Each downloaded constituent file is recorded, on the HDD unit 418, in a storage location indicated by the merge management information file.

The "signature information file" is a file for the merge management information file, indicating an electronic signature of the provider. As the electronic signature, a signature is generally used which is generated by calculating a hash value for information requiring tamper-proofing and encrypting the hash value using some private key. As to the signature information file of the present embodiment, assume that the hash value of the merge management information file has been encrypted using a private key corresponding to a public key in a merge certificate stored in the playback apparatus 400.

Note that the merge certificate may be recorded on the BD-ROM 200 or may be obtained by downloading it from a server apparatus providing the merge certificate via the Internet.

3. Preparing Process

Next, when requested for update of the virtual package from the JA application program being executed by the application execution unit 501, the virtual package management unit 503 executes a preparing process described below.

The virtual package management unit 503 reads, from the HDD unit 418, the downloaded merge management information file and signature information file, decrypts an encrypted hash value in the signature information file using the public key in the merge certificate stored in the playback apparatus 400, calculates a hash value of the merge management information file, and judges whether the merge management information file is authentic, based on whether the decrypted hash value matches the calculated hash value.

The virtual package management unit 503 judges whether the JA application program, which has made a request for updating the virtual package, has authorization to update the virtual package.

In addition, the virtual package management unit 503 judges whether a constituent file group specified in the merge management information file (specifically speaking, a group of constituent files whose file paths to the storage locations are respectively specified by "discID", "contentID", and a file path of a target constituent file) are present in the HDD unit 418.

The virtual package management unit 503 further judges whether the constituent file group specified in the merge management information file includes errors, such as file loss, by referring to the file structure information. Then, the virtual package management unit 503 creates additional content information for recording the error judgment result, and records this result in the HDD unit 418.

Here, the "additional content information" is created based on information of the merge management information file, and is information indicating correspondence among a file path of each file of the target constituent file group, a corresponding alternative content, an ERROR flag showing the error judgment result, and the detail of the error.

FIG. 8 shows a specific example of the additional content information.

When the above judgments are all affirmative, the virtual package management unit 503 performs a process in which the merge management information file, signature information file, and a file specified in the merge management information file are changed to have a read-only attribute.

Thus, as to the files of the HDD unit 418 which are to be mapped to the virtual package, their attribute is set to the read-only. Accordingly, after this point, even if a JA application program specifies a locator to the HDD unit 418 using an API provided by the file management unit 504 and places a request for writing in these files, the request will be denied.

Figure 14:
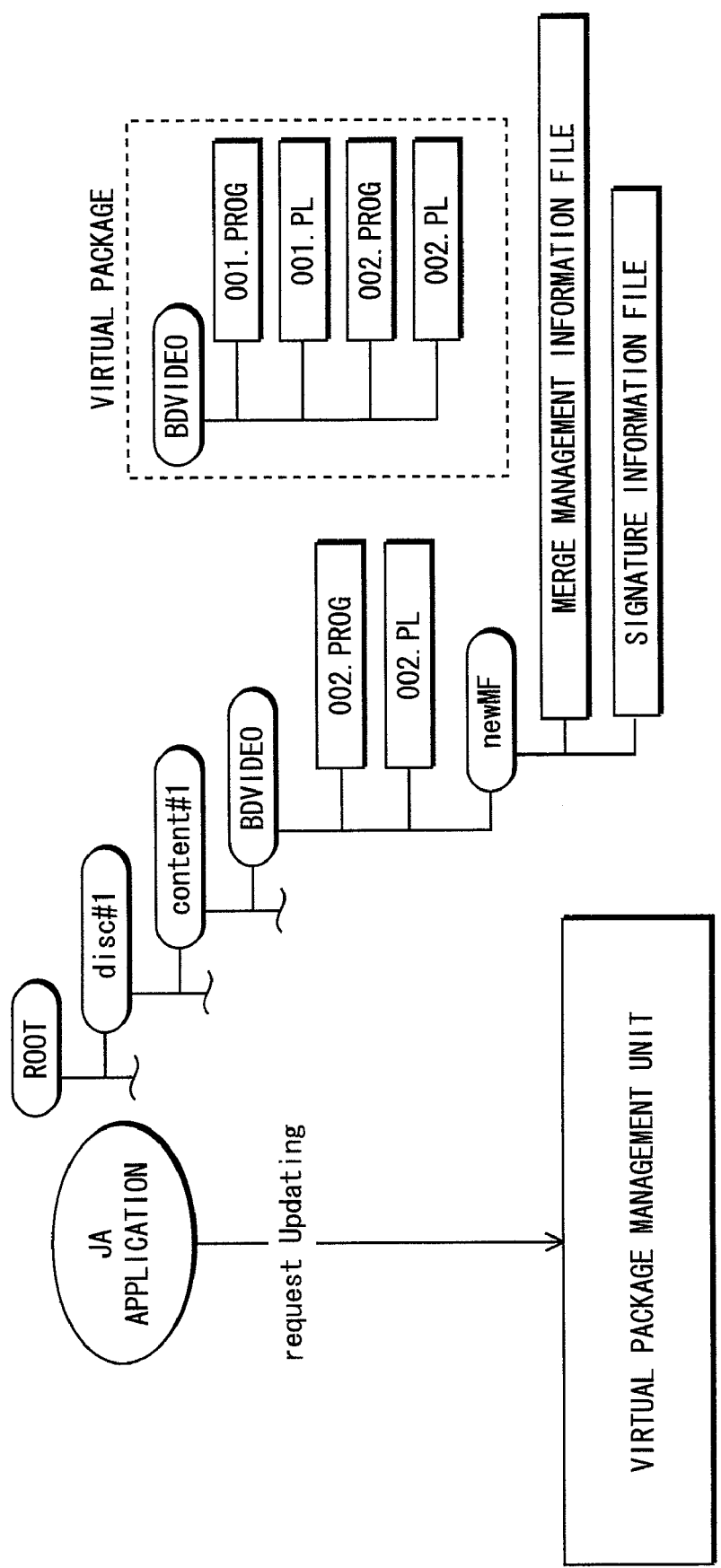
FIG. 14 shows a process that a JA application program requests the virtual package management unit 503 to update a virtual package.

FIG. 14 shows a process that a JA application program requests the virtual package management unit 503 to update the virtual package.

4. Updating Process

Next, the virtual package management unit 503 moves the merge management information file and signature information file to a directory in the HDD unit 401, which corresponds to the discID of the BD-ROM currently in playback.

In the case when merge management information file and signature information file already exist in the destination directory, they are overwritten with the new merge management information file and signature information file, thus replacing the previous ones.

Next, the virtual package management unit 503 maps, to the volume management information, file management information of an alternative file group specified in the merge management information file.

Here, "to map" means to read file management information of a corresponding constituent file specified in the merge management information file, in place of reading file management information of a target constituent file in the volume management information.

Figure 15:
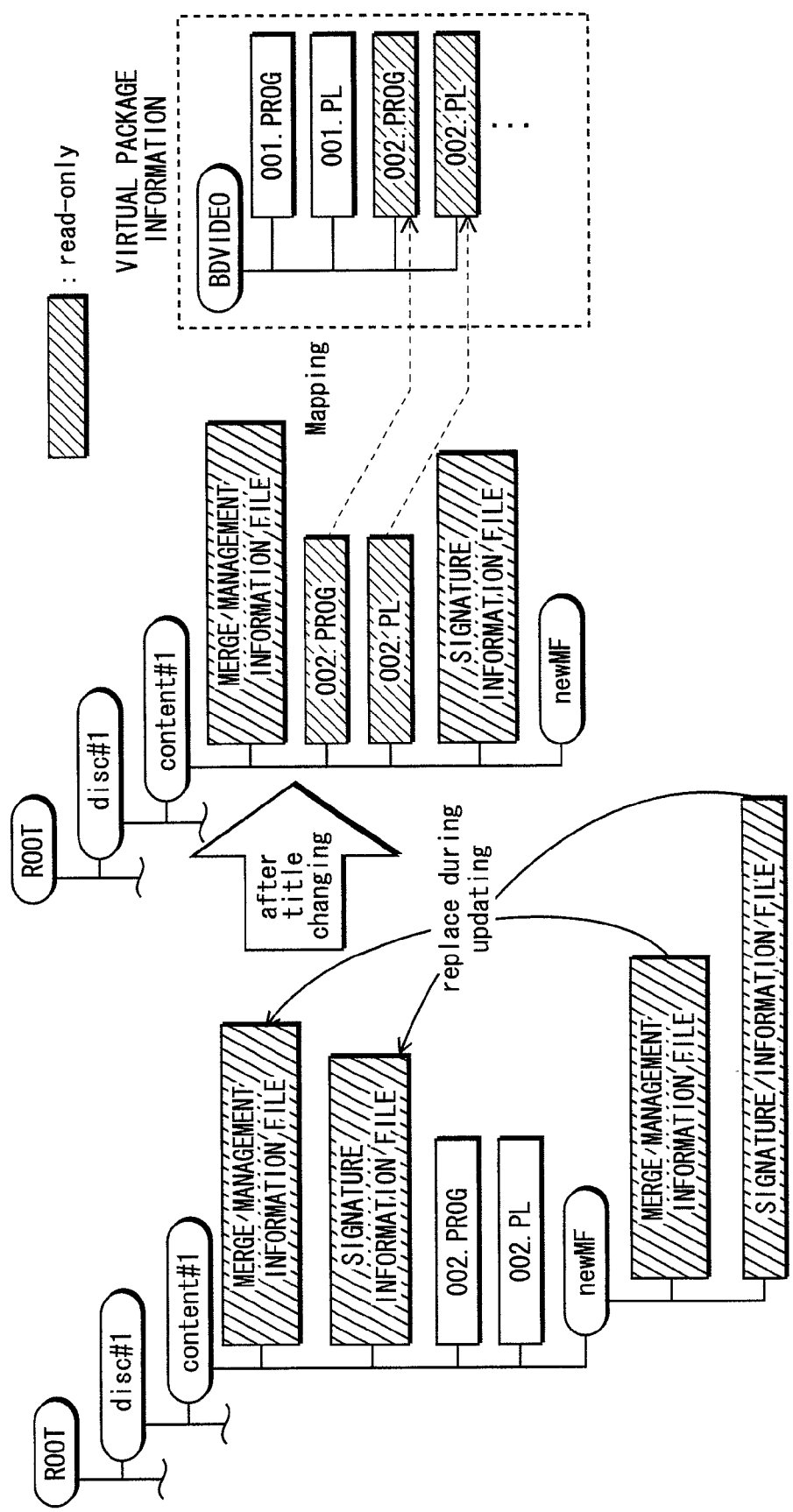
FIG. 15 shows the updating process performed by the virtual package management unit 503.

FIG. 15 shows the updating process performed by the virtual package management unit 503.

In the present embodiment, the judgment of whether a file to which access has been requested is a target constituent file is made by referring to the additional content information. In the case where it is a target constituent file, a corresponding constituent file is read from the HDD unit 418, instead of from a file path of the corresponding constituent file (i.e. a file path composed of a "discID" and a "contentID" corresponding to the access-requested "file path" (discID/contentID/access-requested file path)

File Management Unit 504

The file management unit 504 provides the JA application program in execution with an API used for specifying a locator. In addition, when the playback control unit 417 detects a playback error in a constituent file, the file management unit 504 sets, in the additional content information, an ERROR flag of a corresponding alternative content to "True", which indicates detection of an error, in response to a request of the medium playback unit 502. Then, the file management unit 504 also writes the detail of the error in the additional content information.

Network Management Unit 505

In response to a download request from the virtual package management unit 503, the network management unit 505 downloads data required to create a virtual package from an external server on a WWW site run by a provider of movie works via the network IF unit 419. The data necessary for creating a virtual package includes a merge management information file, a signature information file, an alternative content (a group of constituent files, such as PLs, AV clip information, and AV clips) to replace a replacement-target content on the BD-ROM 200, and file structure information pertaining to the alternative content.

Application Management Unit 506

The application management unit 506 controls the start and end of a JA application program.

<Operations>

Download Process

Figure 9:
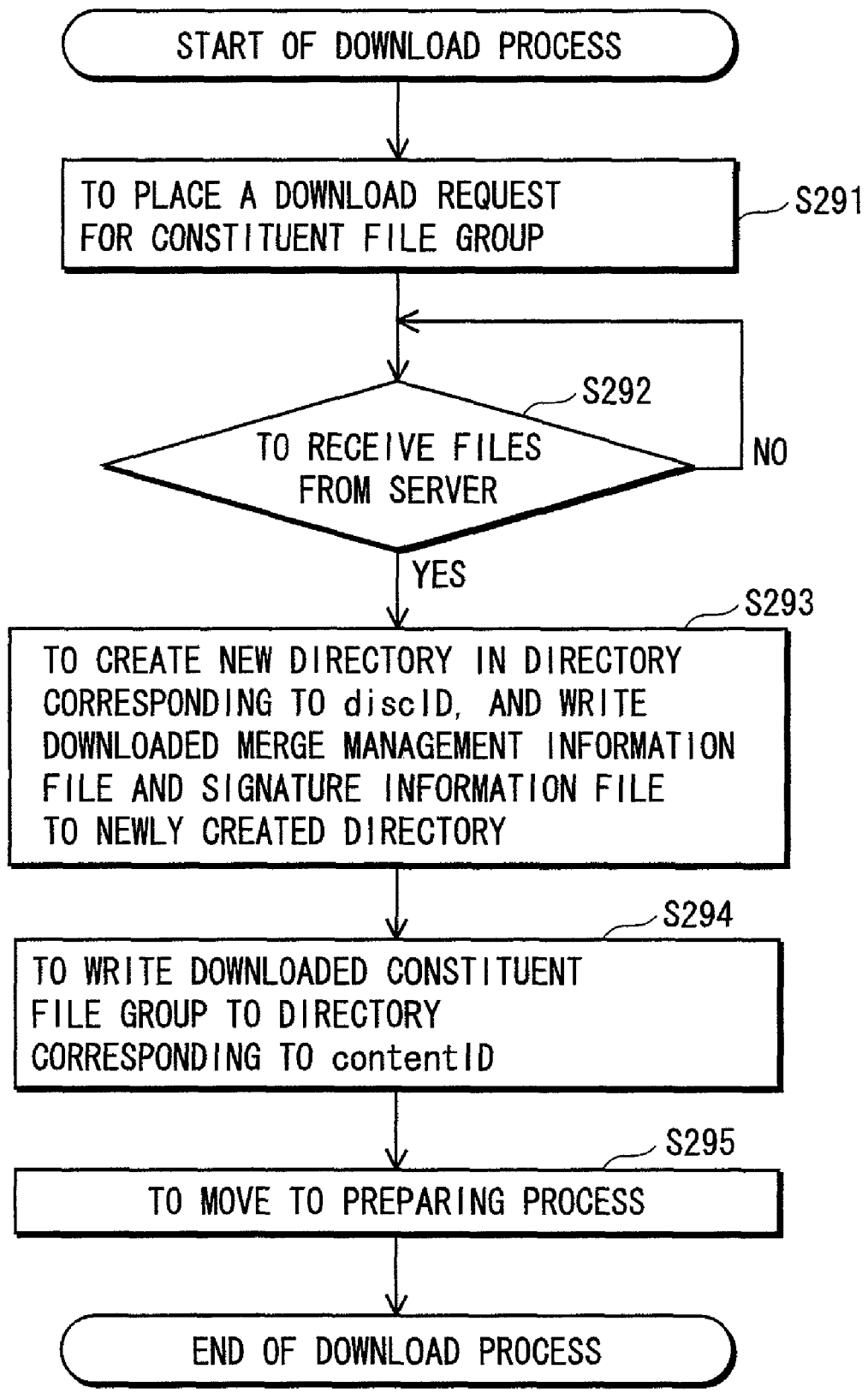
FIG. 9 is a flowchart showing operations of a download process performed by the virtual package management unit 503.

Next are described operations of the download process performed by the virtual package management unit 503. FIG. 9 shows a flowchart showing the operations.

The virtual package management unit 503 informs, via the network management unit 505, an external server that manages files of the BD-RCM 200 about the contentID of a replacement-target content specified by the user and the discID of the BD-ROM 200 to thereby make a download request in order to obtain a constituent file group of a corresponding alternative content (Step S291). When receiving, from the external server, a merge management information file, a signature information file corresponding to the merge management information file, an alternative content, and file structure information of the alternative content (Step S292), the virtual package management unit 503 creates a new directory corresponding to the discID, and writes the downloaded merge management information file and signature information file to the newly created directory (Step S293). Then, referring to storage locations of individual constituent files indicated in the merge management information, the virtual package management unit 503 writes the downloaded constituent file group of the alternative content to a directory corresponding to the contentID, which is located under the directory corresponding to the discID (Step S294), and moves to the preparing process (Step S295).

Preparing Process

Figure 10:
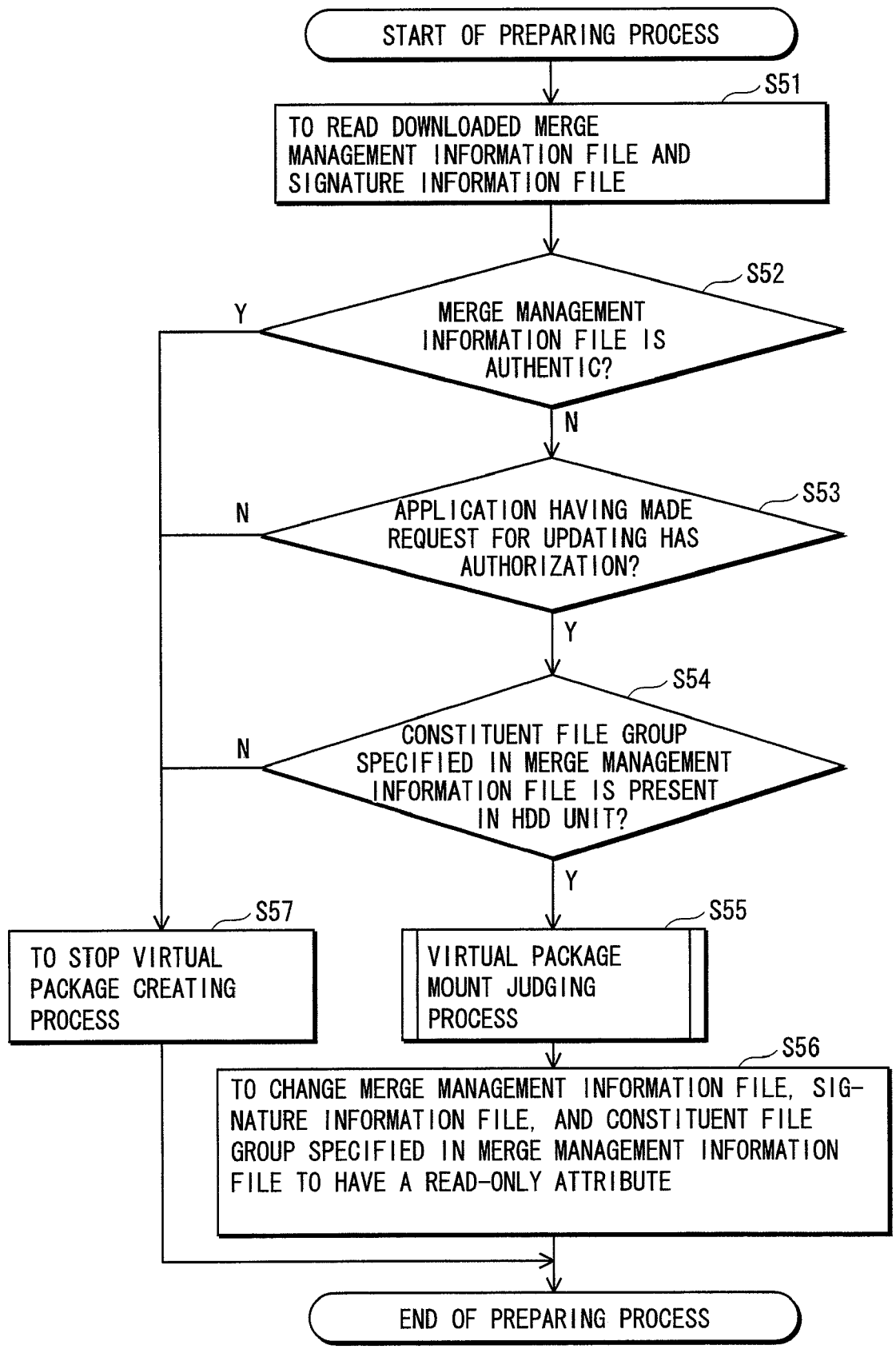
FIG. 10 is a flowchart showing operations of a preparing process performed by the virtual package management unit 503.

Next are described operations of the preparing process performed by the virtual package management unit 503. FIG. 10 is a flowchart showing the operations.

The virtual package management unit 503 reads the downloaded merge management information file and signature information file from the HDD unit 418 (Step S51), decrypts an encrypted hash value in the signature information file using a public key in the merge certificate stored by the playback apparatus 400, then calculates a hash value of the merge management information file, and judges whether the merge management information file is authentic, based on whether the decrypted hash value matches the calculated hash value (it is determined to be authentic when they match each other, while it is determined to be not authentic when they do not match) (Step S52).

The virtual package management unit 503 also judges whether a JA application program that has made a request for updating the virtual package has authorization to update the virtual package (Step S53).

In addition, the virtual package management unit 503 judges whether a constituent file group specified in the merge management information file is present in the HDD unit 418 (Step S54).

In the case where at least one of the judgments in Steps S52 to S54 is negative, the virtual package management unit 503 stops the virtual package creating process (Step S57). On the other hand, when all the judgments in Steps S52 to S54 are affirmative, the virtual package management unit 503 performs a virtual package mount judging process to be hereinafter described (Step S55). If the judgment of the virtual package mount judging process is affirmative, the virtual package management unit 503 performs a process in which the merge management information file, the signature information file, and the constituent file group specified in the merge management information file are changed to have a read-only attribute (Step S56).

Updating Process

Figure 11:
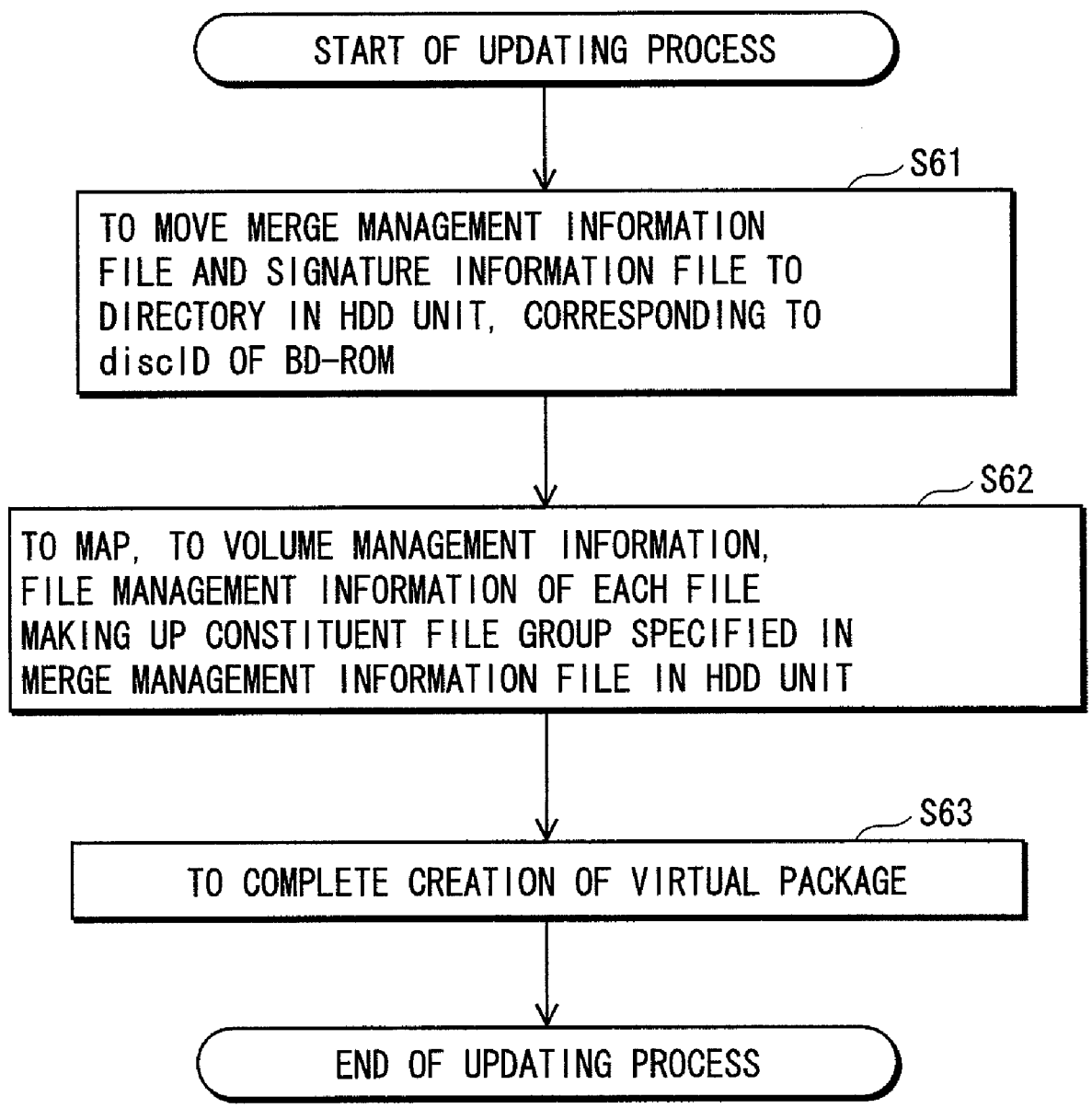
FIG. 11 is a flowchart showing operations of an updating process performed by the virtual package management unit 503.

Next are described operations of the updating process performed by the virtual package management unit 503. FIG. 11 is a flowchart showing the operations.

The virtual package management unit 503 moves the merge management information file and signature information file to a directory in the HDD unit 401, which corresponds to a discID of the BD-ROM currently in playback (Step S61), maps, to the volume management information, file management information of the constituent file group specified in the merge management information file (Step S62), and completes the virtual package creating process (Step S63).

Virtual Package Mount Judging Process A

Figure 18:
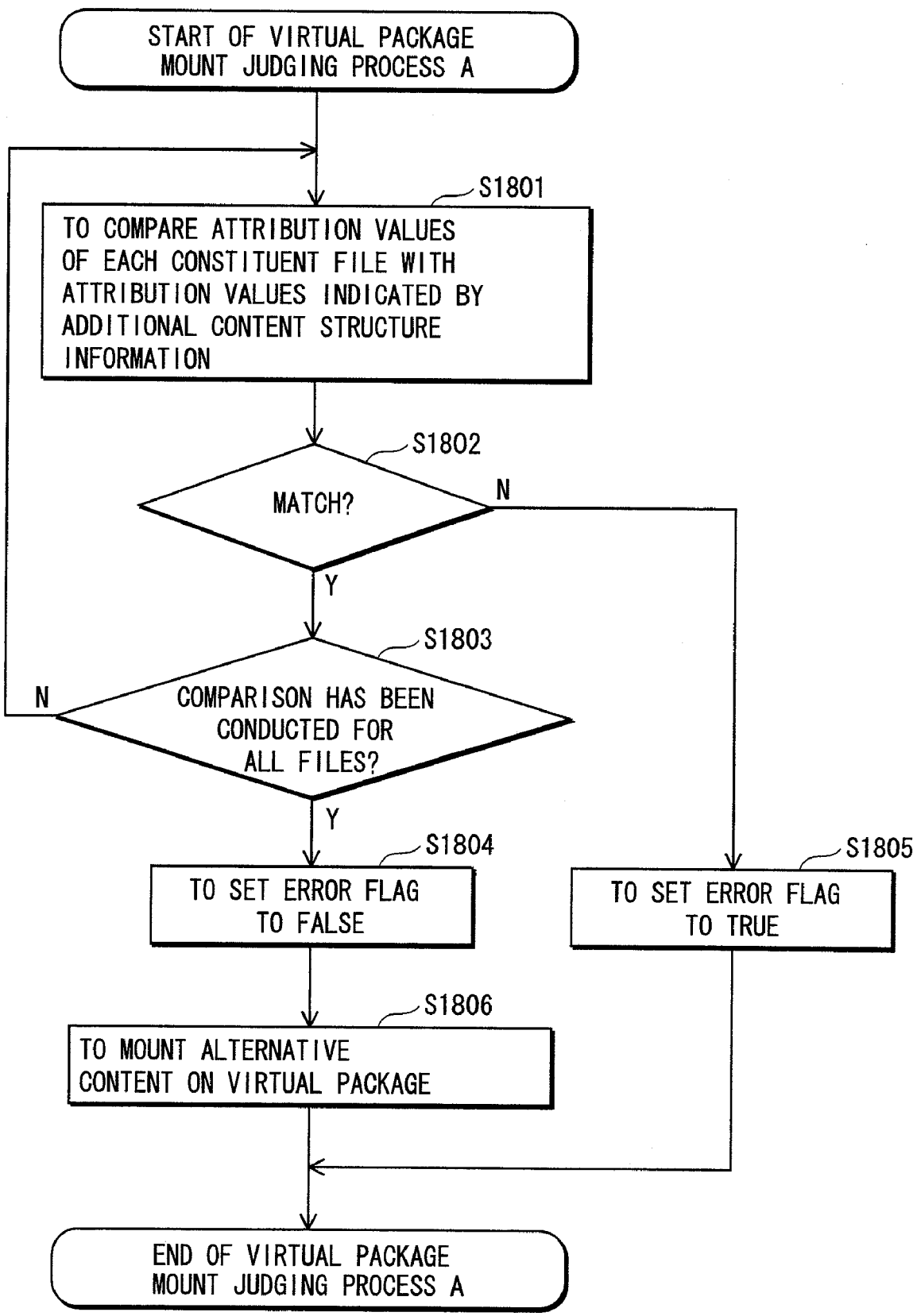
FIG. 18 is a flowchart showing operations of a virtual package mount judging process A performed by the virtual package management unit 503.

Next are described operations of a virtual package mount judging process A performed by the virtual package management unit 503. FIG. 18 is a flowchart showing the operations.

For each constituent file of the downloaded alternative content, the virtual package management unit 503 compares attribute values (file size, hash value, and CRC value) indicated by a constituent file recorded on the HDD unit 418 with attribute values indicated by the file structure information (Step S1801). When they do not match (Step S1802: N), the virtual package management unit 503 sets, in the additional content information, an ERROR flag associated with the contentID of an alternative content to which the constituent file belongs to "TRUE" that indicates detection of an error (Step S1805).

When they match each other in the judgment of Step S1802 (Step S1802: Y), the virtual package management unit 503 then judges whether the comparison has been conducted for all the constituent files (Step S1803).

When the comparison has been conducted for all the constituent files (Step S1803: Y), the virtual package management unit 503 sets the ERROR flag of the additional content information to "FALSE", which indicates an error has not been detected (Step S1804), and mounts the alternative content on the virtual package (Step S1806).

Here, "to mount" means to set an alternative content as a mapping target for the virtual package.

When the process of Step S1803 is negative (Step S1803: N), the virtual package management unit 503 moves to a process of Step S1801.

Virtual Package Updating Process A

Figure 16:
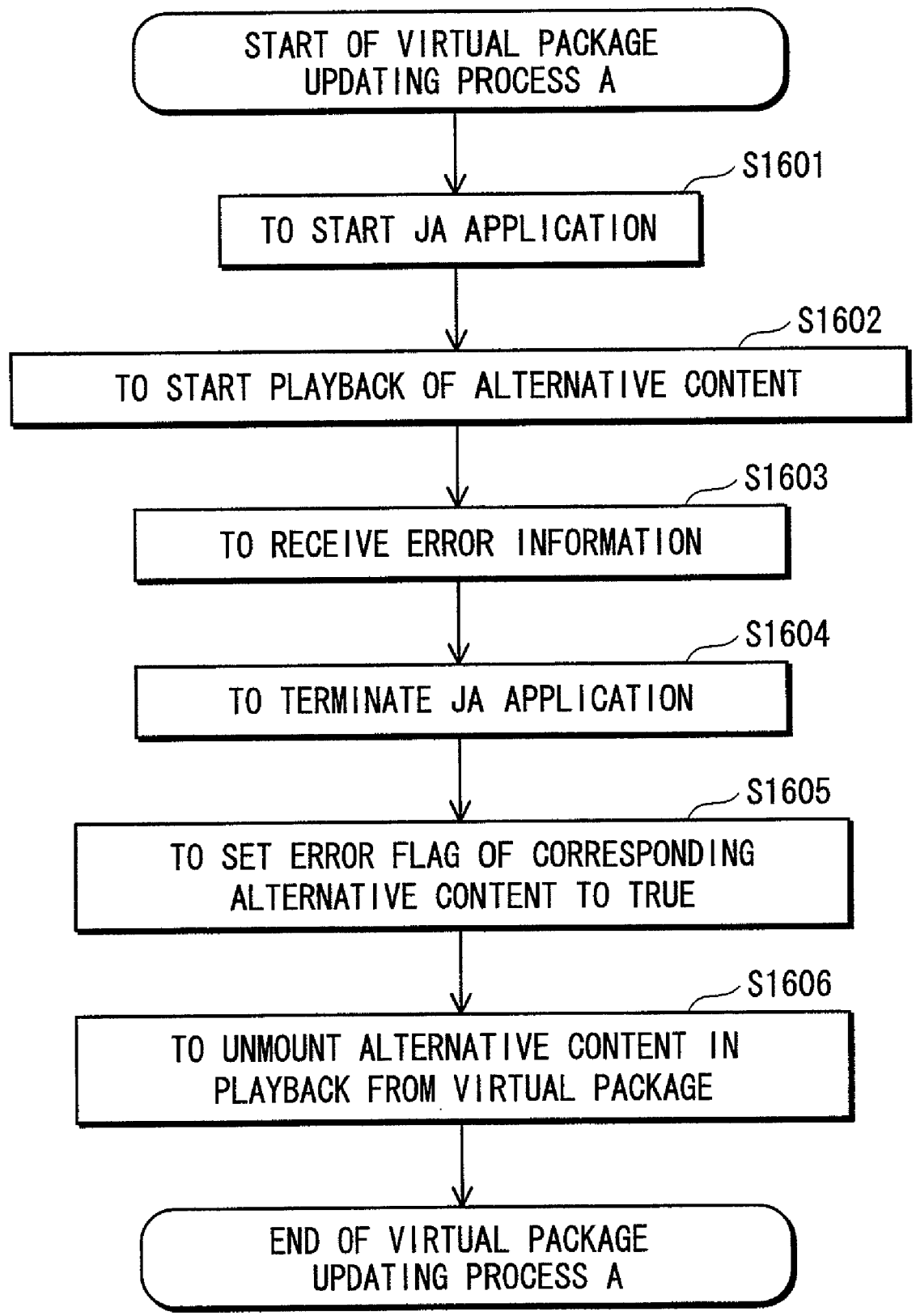
FIG. 16 is a flowchart showing operations of a virtual package updating process A performed by the JA playback processing unit 414 in the case when an error occurs during the playback of an alternative content.

Next are described operations of a virtual package updating process A performed by the JA playback processing unit 414 when an error occurs during playback of an alternative content. FIG. 16 is a flowchart showing the operations.

The JA playback processing unit 414 starts up a JA application program in response to a process instruction from the mode management unit 416 (Step S1601). After the playback of an alternative content has been started (Step S1602) and if file error information pertaining to a constituent file are received from the playback control unit 417 (Step S1603), the JA playback processing unit 414 forcibly terminates the currently executing JA application program (Step S1604). Then, the JA playback processing unit 414 sets, in the additional content information, an ERROR flag associated with the contentID of the alternative content to "TRUE" which indicates detection of an error (Step S1605), and unmounts the alternative content in playback from the virtual package (Step S1606).

Here, "to unmount" means not to set an alternative content as a mapping target for the virtual package.

File Access Destination Determining Process

Next are described operations of a file access destination determining process performed by the virtual package management unit 503. FIG. 19 is a flowchart showing the operations.

When receiving a request for accessing a file using a locator on the BD-ROM 200 via the playback control unit 417 from an application program (a JA application program, or a scenario program) currently in execution (Step S1901), the virtual package management unit 503 refers to the additional content information and judges whether a file path indicating the access requested destination is recorded in the additional content information (Step S1902).

When it is recorded in the additional content information (Step S1902: Y), the virtual package management unit 503 specifies as an access destination a file path on the HDD unit 418, which is specified in the additional content information (Step S1903).

When it is not recorded in the additional content information (Step S1902: N), the virtual package management unit 503 specifies as the access destination a file path on the BD-ROM 200, which is indicated by the file access request (Step S1904).

Embodiment 2

<Configuration>

Embodiment 2 differs from Embodiment 1 in operations of the virtual package mount judging process and of the virtual package updating process. Other aspects are the same as in Embodiment 1, and therefore the following description focuses mainly on the differences.

In Embodiment 2, the alternative content provided from the external server of the provider is updated as needed.

FIG. 20 shows a specific example of additional content information used in Embodiment 2. The additional content information is explained next, with the focus mainly on differences from that of Embodiment 1.

The contentID recorded in the additional content information of Embodiment 2 includes information indicating an update timing in addition to the information used for identifying the type of the content.

For example, the contentID in the top row of the table shown in FIG. 20, "KOREAN_200607161700", the part "KOREAN" indicates the type of the content, and the part "200607161700" indicates an update timing—specifically speaking, indicating that the content was updated on Jul. 16, 2006 at 17:00. The same applies to other contentIDs of FIG. 20.

Note that the information indicating the update timing is not limited to the date and time information like the case above. For example, a numerical value incremented or decremented according to an update may be included in the contentID.

In addition, as to the additional content information of Embodiment 2, a normal contentID is associated with each contentID.

Here, the "normal contentID" is a contentID of an alternative content having the latest update timing (hereinafter, this alternative content is referred to as "normal content") among the same type of alternative contents which have been determined, in a virtual package updating process B to be hereinafter described, to be normally played back (such alternative contents are indicated with an ERROR flag of "FALSE" in the additional content information).

For example, as to the contentID in the second row from the top in the table of FIG. 20, "KOREAN_200607192100", two contentIDs which are the same type and have an ERROR flag of "FALSE" exist in the additional content information, i.e. "KOREAN_200607171700" and "KOREAN_200607161700". Since "KOREAN_200607171700" was updated more recently, "KOREAN_200607171700" is associated as the normal contentID.

If, at the time of recording of an alternative content in the additional content information, a corresponding normal content is not included therein, no normal content's contentID is associated with the contentID of the alternative content. This is indicated with "—" in the table of FIG. 20.

In Embodiment 1, the ERROR flag is set to "FALSE" if an error is not detected in the constituent file group in the virtual package mount judging process, which is performed when an alternative content has been downloaded. However, according to Embodiment 2, the ERROR flag is set to "FALSE" when the alternative content is determined, in a virtual package updating process to be described hereinafter, to be normally played back. Here, when no error is detected at the time of download and it has yet to be determined whether the alternative content would be normally played back, the ERROR flag is set to "UNKNOWN" as shown in FIG. 20.

<Operations>

Virtual Package Mount Judging Process B

The following explains operations of a virtual package mount judging process B performed by the virtual package management unit 503.

Figure 21:
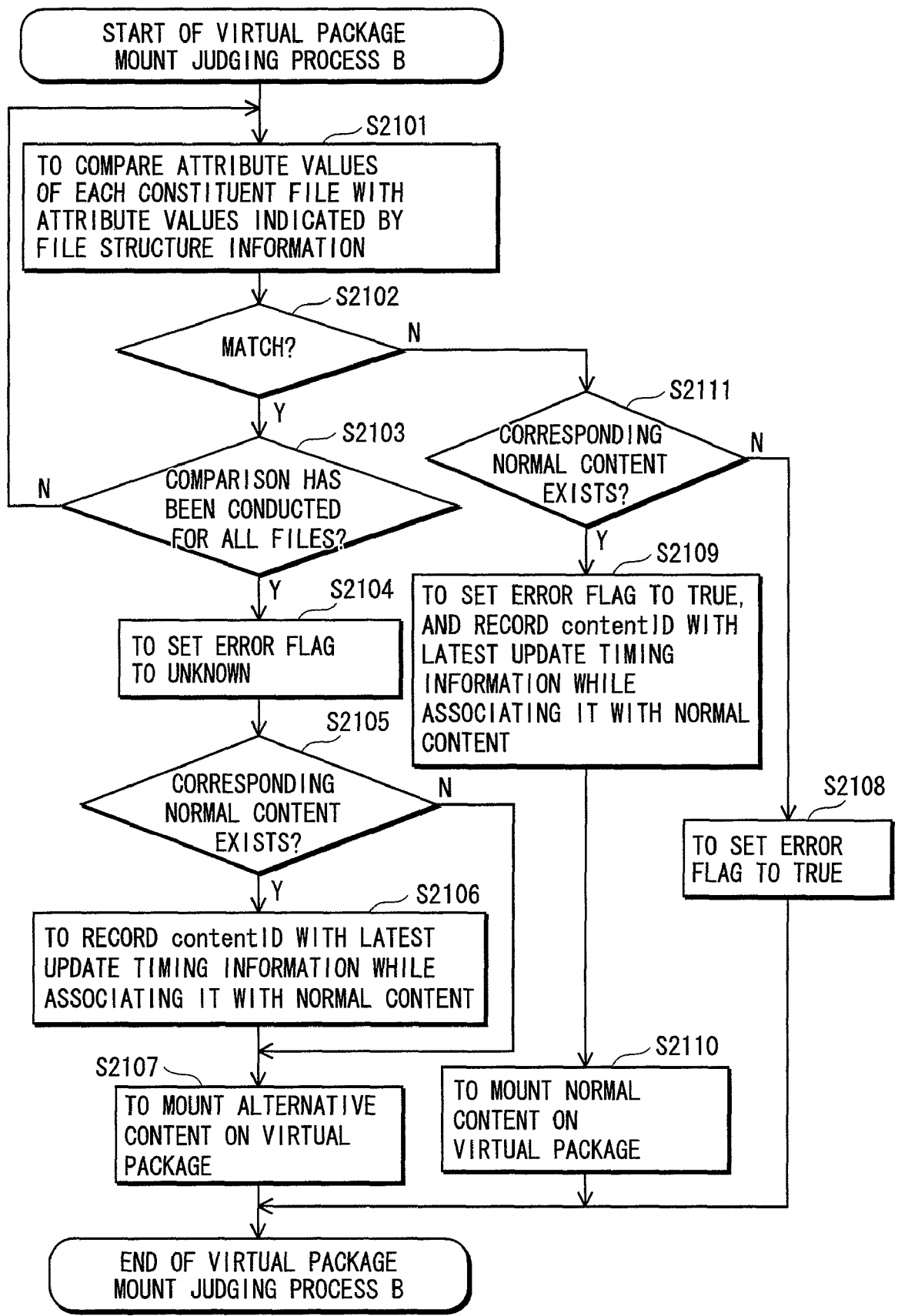
FIG. 21 is a flowchart showing operations of a virtual package mount judging process B performed by the virtual package management unit 503.

FIG. 21 is a flowchart showing the operations.

For each constituent file of the downloaded alternative content, the virtual package management unit 503 compares attribute values (file size, hash value, and CRC value) indicated by a constituent file recorded on the HDD unit 418 with attribute values indicated by the file structure information (Step S2101). When they do not match (Step S2102: N), the virtual package management unit 503 refers to the additional content information and searches for a contentID that is the same type as the contentID to which the constituent file belongs and that has an ERROR flag of "FALSE", and thereby judges whether a normal content with which the contentID of the alternative content can be associated exists or not (Step S2111).

When it exists (Step S2111: Y), the virtual package management unit 503 sets, to "TRUE", an ERROR flag of the contentID to which the constituent file belongs. Then, the virtual package management unit 503 records, among contentIDs found as a result of the above search, a contentID having the latest update timing in the additional content information while associating it with the normal contentID (Step S2109), and mounts the normal content on the virtual package, in place of the alternative content in which an error has been detected (Step S2110).

When a normal content with which the contentID of the alternative content can be associated does not exist (Step S2111: N), the virtual package management unit 503 sets, to "TRUE" which indicates detection of an error, an ERROR flag associated with the contentID of the alternative content to which the constituent file belongs (Step S108).

When their attribute values match each other (Step S2102: Y), the virtual package management unit 503 judges whether the comparison has been conducted for all the constituent files (Step S2103).

When the comparison has been conducted for all the constituent files (Step S2103: Y), the virtual package management unit 503 sets the ERROR flag of the additional content information to "UNKNOWN" (Step S2104). Then, the virtual package management unit 503 refers to the additional content information and searches for a contentID that is the same type as the contentID to which the constituent file belongs and that has an ERROR flag of "FALSE", and thereby judges whether a normal content with which the contentID of the alternative content can be associated exists or not (Step S2105). The virtual package management unit 503 records, among contentIDs found as a result of the above search, a contentID having the latest update timing in the additional content information while associating it with the normal contentID (Step S2106), and mounts the downloaded alternative content on the virtual package (Step S2107).

When the judgment of Step S2103 is negative (Step S2103: N), the virtual package management unit 503 moves to a process of Step S2101; when the judgment of Step S2105 is negative (Step S2105: N), it moves to a process of Step S2107.

Virtual Package Updating Process B

Figure 22:
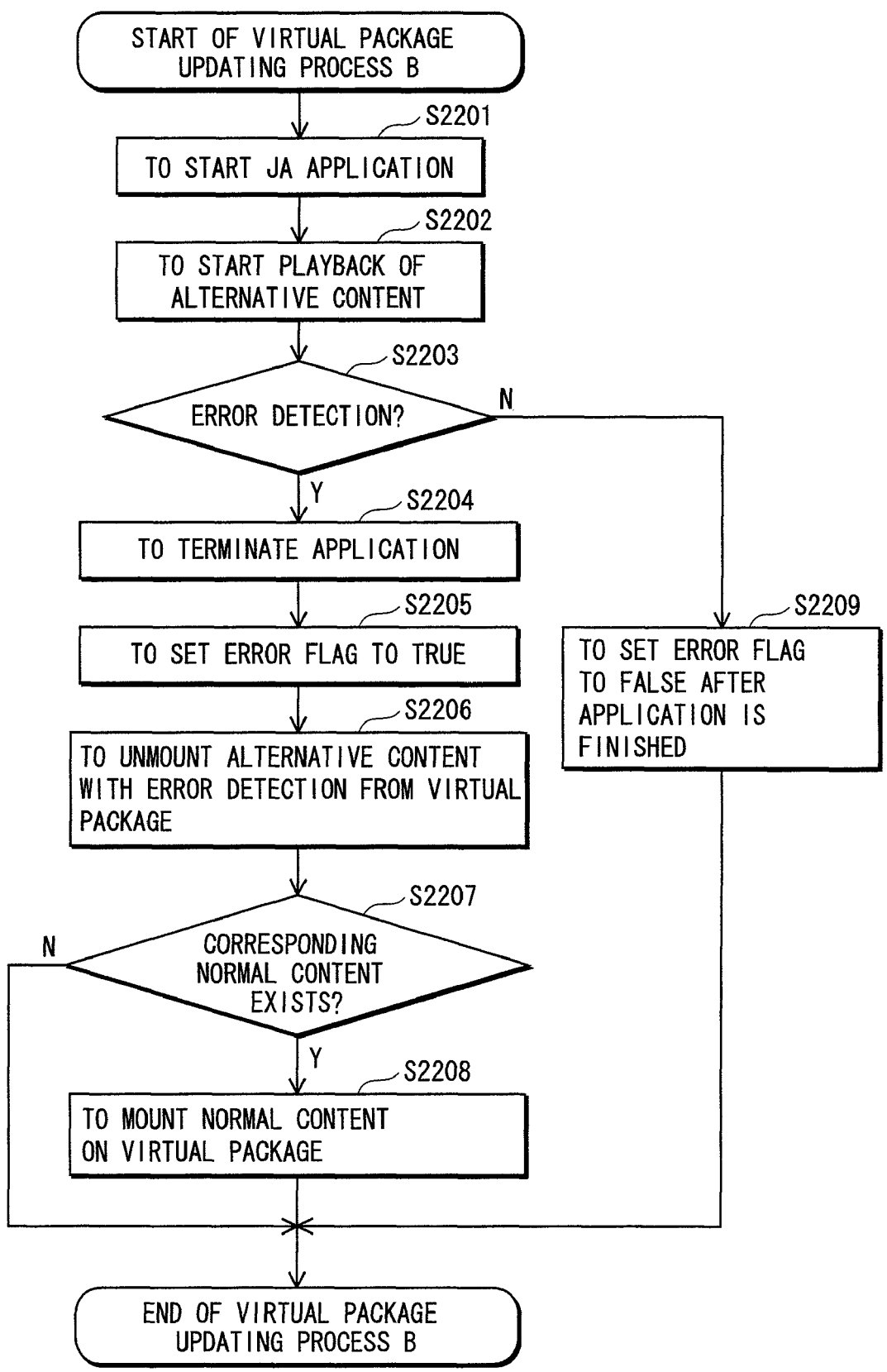
FIG. 22 is a flowchart showing operations of a virtual package updating process B performed by the JA playback processing unit 414.

The following describes operations of a virtual package updating process B performed by the JA playback processing unit 414. FIG. 22 is a flowchart showing the operations.

The JA playback processing unit 414 starts up a JA application program in response to a process instruction from the mode management unit 416 (Step S2201). After the playback of an alternative content is started (Step S2202), the JA playback processing unit 414 judges whether an error is detected or not by monitoring whether the playback control unit 417 has sent file error information regarding a constituent file (Step S2203).

In the case where no error is detected (Step S2203: N), after the JA application program is finished, the JA playback processing unit 414 sets, to "FALSE", an ERROR flag associated with the contentID of the alternative content with no error detection (Step S2209).

When an error is detected (Step S2203: Y), the JA playback processing unit 414 forcibly terminates the JA application program in execution (Step S2204), and sets, in the additional content information, an ERROR flag associated with the contentID of the alternative content to "TRUE" which indicates detection of an error (Step S2205). The JA playback processing unit 414 unmounts the alternative content, in which an error has been detected, from the virtual package (Step S2206). Then, the JA playback processing unit 414 refers to the additional content information to know whether a contentID of a normal content is associated with the contentID of the alternative content, and thereby judges whether a corresponding normal content exists (Step S2207). When it exists (Step S2207: Y), the JA playback processing unit 414 mounts the normal content on the virtual package (Step S2208).

Embodiment 3

<Configuration>

Although having the same configuration as Embodiment 2, Embodiment 3 differs in operations of the virtual package mount judging process and of the virtual package updating process. In Embodiment 2, when an error is detected in an alternative content, a corresponding normal content is mounted on the virtual package; however, the present embodiment allows the user to choose an alternative content to be mounted.

The following describes operations of the virtual package mount judging process and the virtual package updating process, which are different from those in Embodiment 2.

<Operations>

Virtual Package Mount Judging Process C

Figure 23:
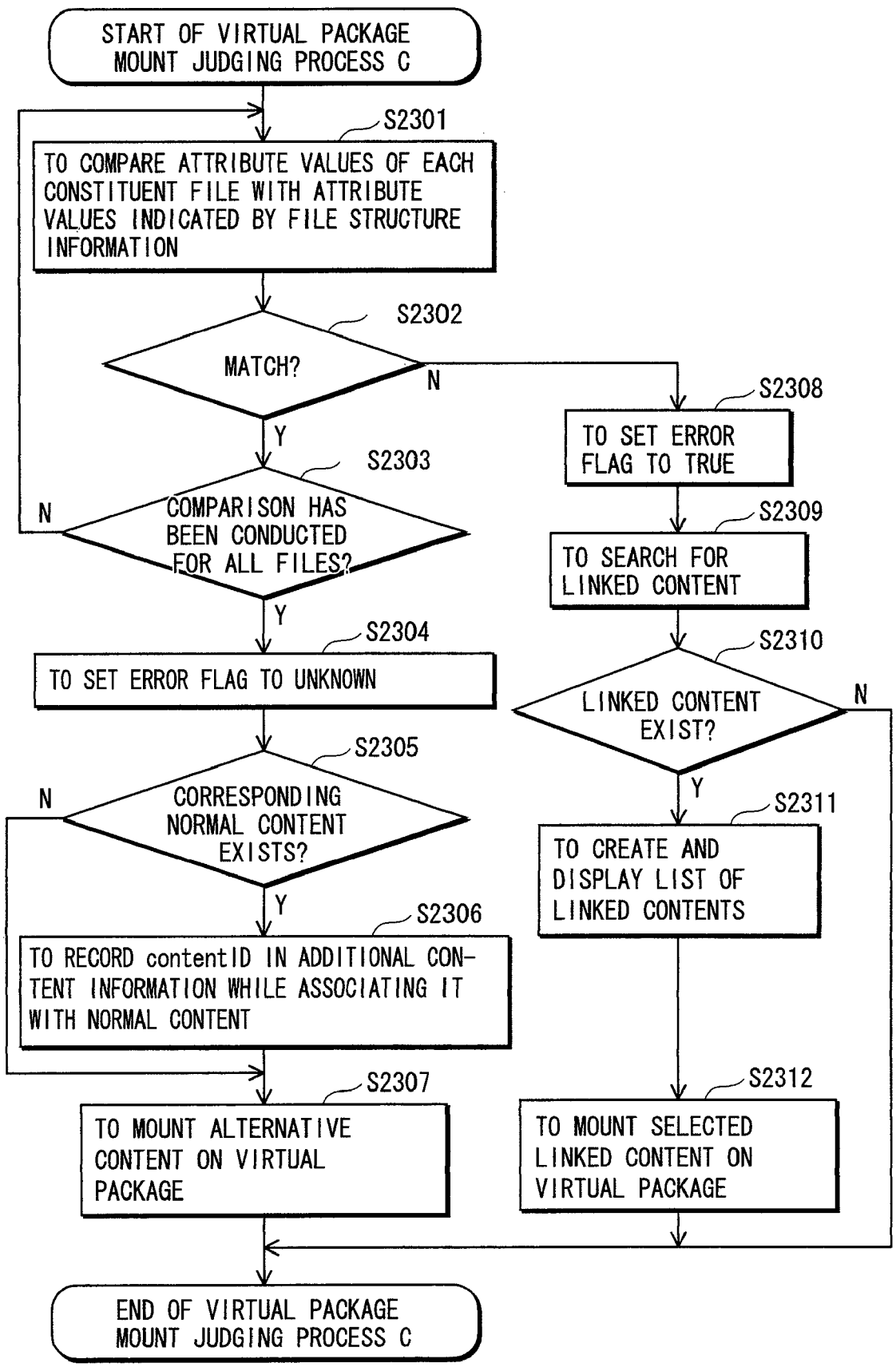
FIG. 23 is a flowchart showing operations of a virtual package mount judging process C performed by the virtual package management unit 503.

Next are described operations of a virtual package mount judging process C performed by the virtual package management unit 503. FIG. 23 is a flowchart showing the operations.

For each constituent file of the downloaded alternative content, the virtual package management unit 503 compares attribute values (file size, hash value, and CRC value) indicated by a constituent file recorded on the HDD unit 418 with attribute values indicated by the file structure information (Step S2301). When they do not match (Step S2302: N), the virtual package management unit 503 sets, to "TRUE", an ERROR flag of the contentID to which the constituent file belongs (Step S2308), and refers to the additional content information and searches for a contentID of a linked content that is the same type as the contentID to which the constituent file belongs and that has an ERROR flag of "FALSE" (Step S2309). When one or more linked contents exist (Step S2310: Y), the virtual package management unit 503 creates a GUI (Graphic User Interface) showing a list of discIDs and contentIDs of those linked contents (the list is hereinafter referred to as "linked content list"), then causes the TV 500 to display the GUI (Step S2311), and mounts a linked content selected by the user on the virtual package (Step S2312).

FIG. 24 shows a specific example of a GUI display screen of a linked content list displayed on the TV 500.

The processes of Steps S2303 to S2307 performed when the judgment of Step S2302 is affirmative (Step S2302: Y) are the same as those of Steps S2103 to S2107 in FIG. 21, and the descriptions are therefore omitted.

Virtual Package Updating Process C

Next are described operations of a virtual package updating process C performed by the JA playback processing unit 414. FIG. 30 is a flowchart showing the operations.

Since the processes of Steps S3001 to S3006 are the same as those of Steps S2201 to S2206 in FIG. 22, while the process of Step S3009 is the same as that of Step S2209, their descriptions are omitted.

After conducting the process of Step S3006, the JA playback processing unit 414 judges whether a linked content exists by referring to the additional content information and searching for a contentID of a linked content that is the same type as the contentID of the alternative content in which an error has been detected (Step S3007).

When one or more linked contents exist (Step S3007: Y), the JA playback processing unit creates a GUI of the linked content list, then causes the TV 500 to display the GUI (Step S3008), and mounts a linked content selected by the user on the virtual package (Step S3010).

Embodiment 4

<Configuration>

In Embodiment 1, when an error is detected during playback of an alternative content, the JA application program is terminated. The present embodiment differs from Embodiment 1 in that a JA application program is started so as to have a main menu displayed. The following description focuses on the differences from Embodiment 1, and the descriptions of the features in common are omitted here.

Figure 25:
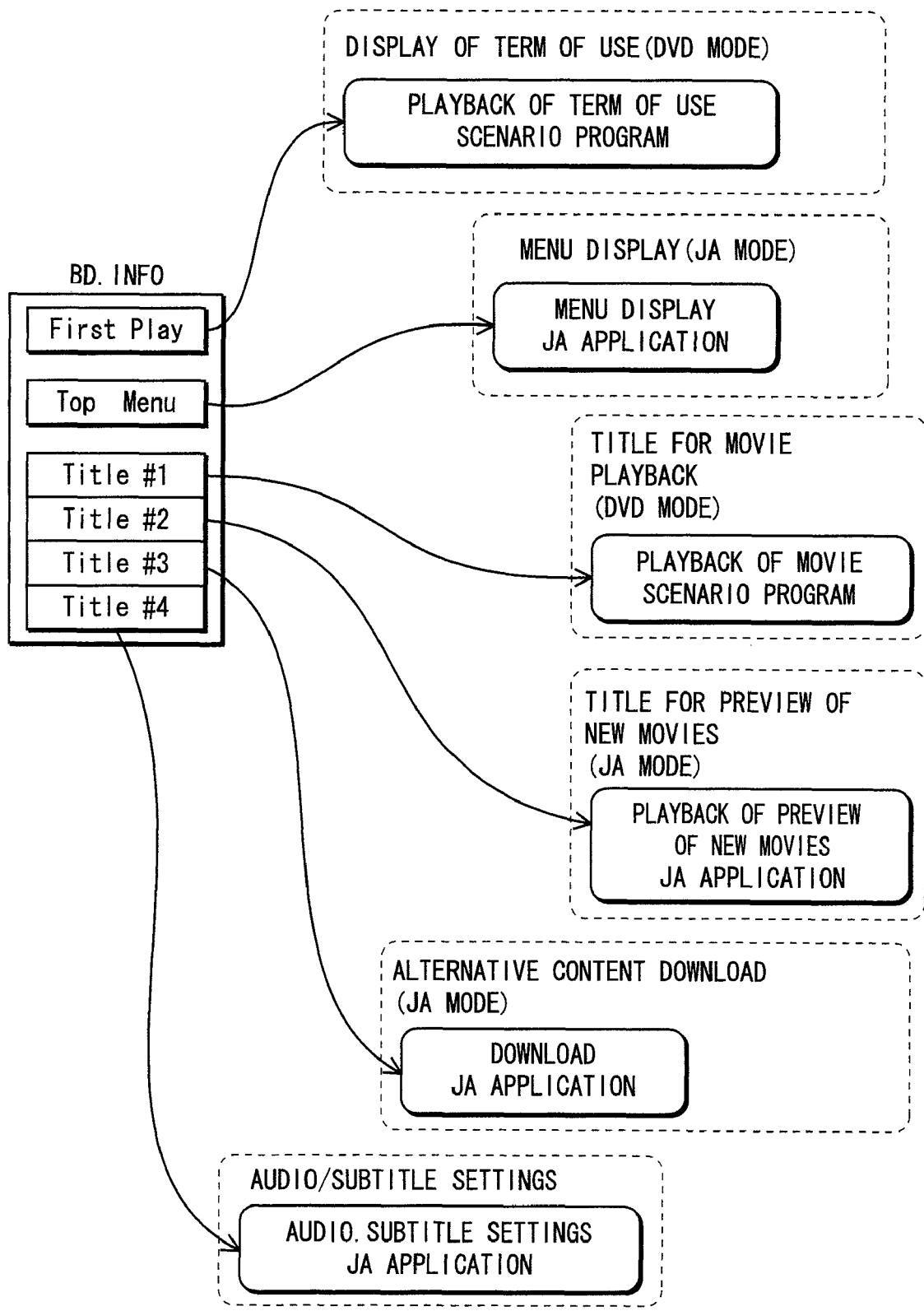
FIG. 25 graphically shows the relationship—shown in a management table included in BD.INFO—between titles and application programs each used for playing back a content indicated by a corresponding title.

FIG. 25 graphically shows the relationship—shown in a management table included in BD.INFO—between titles and application programs each used for playing back a content indicated by a corresponding title.

Here, "First Play" is a title automatically selected by the mode management unit 416 at the time of the start-up of the BD-ROM 200 and then played back.

"Top Menu" is a title selected by the mode management unit 416 at the time when an application program executing a title is finished and then played back. This title is a title for receiving a title selection from the user, displaying user selectable titles—i.e. all titles included in the BD-ROM 200, except for "First Play"—in GUI.

"Title #1 to Title #4" are user selectable titles in the GUI display screen of "Top Menu".

Here, "Title #1" is a title for playing back the main movie; "Title #2" is a title for playing back a preview of new movies; "Title #3" is a title for implementing download of an alternative content; and "Title #4" is a title for making audio and subtitle settings for the movie.

Figure 26:
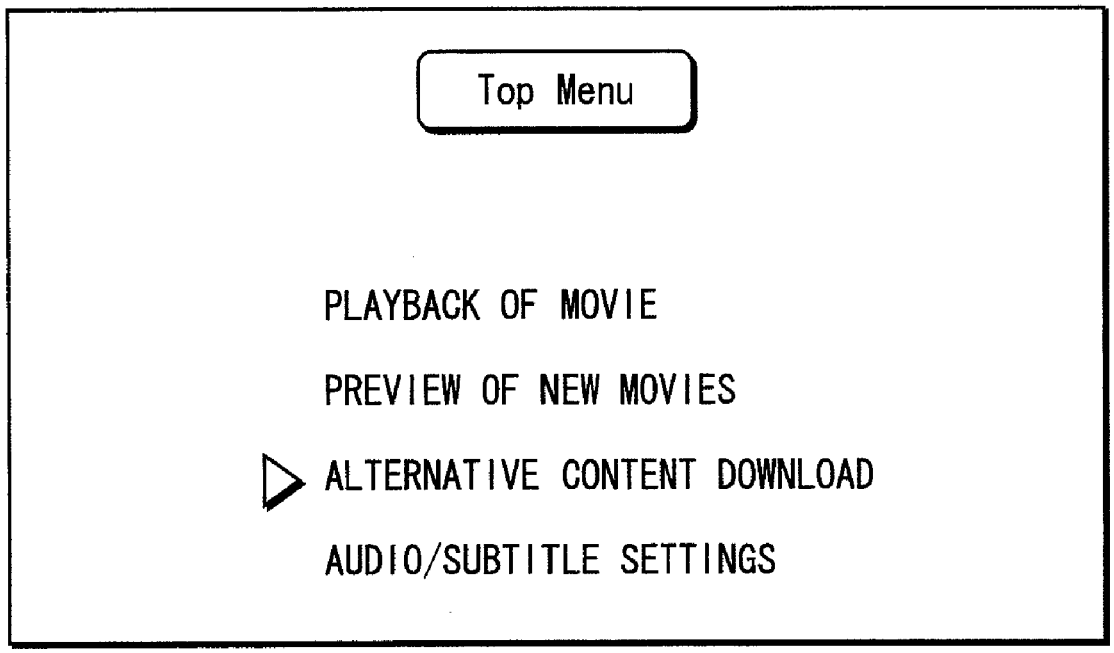
FIG. 26 shows a specific example of a GUI display screen displayed by the title of "Top Menu" of FIG. 25.

FIG. 26 shows a specific example of a GUI display screen displayed by the title of "Top Menu" of FIG. 25.

<Operations>

Top Menu Display Control Process

The following describes operations of a top menu display control process performed by the playback processing unit 412.

Figure 27:
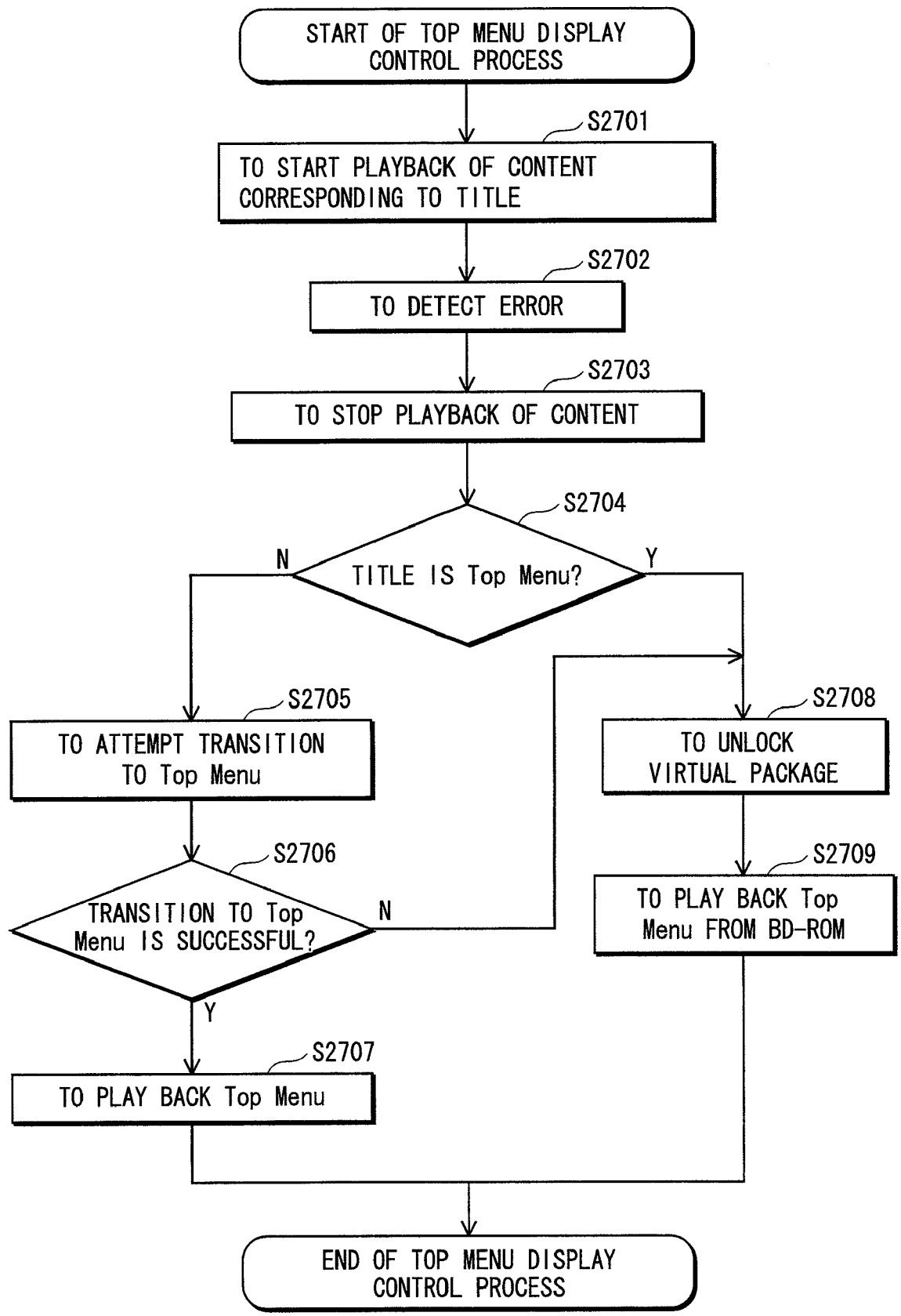
FIG. 27 is a flowchart showing operations of a top menu display control process performed by a playback processing unit 412.

FIG. 27 is a flowchart showing the operations.

The playback processing unit 412 starts up an application program corresponding to a selected title, and starts playback of a content associated with the application program (Step S2701). When detecting an error (Step S2702), the playback processing unit 412 stops playback of the content (Step S2703) and judges whether the selected title is "Top Menu" (Step S2704).

When it is not "Top Menu" (Step S2704: N), the playback processing unit 412 starts up a JA application program associated with the title of "Top Menu" and attempts transition to "Top Menu" display (Step S2705). Then, when a transition to "Top Menu" is successful (Step S2706: Y), the playback processing unit 412 plays back a display screen of "Top. Menu" (Step S2707).

When the judgment of Step S2704 is affirmative (Step S2704: Y) or when the judgment of Step S2706 is negative (Step S2706: N), the playback processing unit 412 unlocks the virtual package (Step S2708), and reads a JA application program associated with "Top Menu" from the BD-ROM 200 and starts up the JA application program. Then, the playback processing unit 412 plays back a content of "Top Menu" associated with the JA application program and plays back the display screen of "Top Menu" (Step S2709).

Here, "to unlock the virtual package" means to prevent the file management information of an alternative file group specified in the merge management information file to be mapped to the volume management information. That is, a setting is made so that all files are read from the BD-ROM 200.

<Additional Particulars>

The playback apparatus 400 of the present invention has been described based on Embodiments 1 to 4; however, it is a matter of course that the present invention is not limited to these embodiments.

(1) In Embodiments 1 to 4, download of an alternative content is performed when a selection is made by the user; however, when a playback error is detected by the playback control unit 417 during playback of a content recorded on the BD-ROM 200, the playback processing unit 412 may inform the external server of the contentID of the content and download the alternative content.

In the virtual package mount judging processes A to C, when an error is detected in a constituent file and the ERROR flag is set to "TRUE", the playback processing unit 412 may inform the external server of the contentID to which the constituent file belongs and download the alternative content.

(2) In Embodiments 1 to 4, when the ERROR flag of the additional content information is set to "TRUE", constituents files making up a corresponding content may be deleted from the HDD unit 418.

The deletion may be conducted at the time of the ERROR flag setting, may be conducted periodically at predetermined intervals, or may be conducted in response to a request from the user.

(3) In Embodiments 1 to 4, the virtual package management unit 503 performs the file access destination determining process based on the additional content information; however, the process may be performed based on merge management information obtained from an external server.

(4) In Embodiments 1 to 4, a program language of the program executed by the JA playback processing unit 414 is Java™; however, a different language—B-Shell used on UNIX™ OS, Perl Script, or ECMA Script, for example—may be used, instead.

(5) In the operations of the top menu display control process of Embodiment 4, shown in FIG. 27, when the judgment of Step S2704 is affirmative, the playback processing unit 412 may judge whether a content in which an error has been detected is an alternative content, and then move to the process of Step S2708 only when it is an alternative content.

INDUSTRIAL APPLICABILITY

The present invention relates to a playback apparatus and a playback method of playing back data from a recording medium, such as a BD-ROM, and is applicable to technology for reducing the occurrence of errors arose at the time of the data playback.

The invention claimed is:

1. A playback apparatus for playing back an AV stream data using an external recording medium that stores a plurality of contents, each including the AV stream data and an application program that refers to the AV stream data to play back the AV stream data in a predetermined playback order, the playback apparatus comprising:
an internal recording medium;
a mode manager that selects one of the plurality of contents;
an application executor that executes an application program corresponding to the selected content;
a playback controller that plays back the AV stream data included in the content corresponding to the executed application program;
a network manager that obtains, from an external server including therein one or more alternative contents, (i) an alternative content to replace part of the contents and (ii) correspondence information showing a correspondence between a storage location where the internal recording medium of the alternative content is stored and a storage location where the external recording medium of the part of the contents to be replaced is stored, and stores the obtained alternative content and correspondence information in the internal recording medium; and
a virtual package manager that includes:
a first judger that judges, based on the correspondence information, whether or not the alternative content exists on the internal recording medium; and
a second judger that detects whether there is an error in the alternative content, stores a detection result showing a result of the detection as additional information in the internal recording medium, and judges whether or not an error is detected in the alternative content in accordance with the detection result stored as the additional information, and
at a time when the application program being executed reads the AV stream data included in a content being referred to,
when the judgment by the first judger and the judgment by the second judger are affirmative, reads the alternative content stored in the storage location on the internal recording medium corresponding to the storage location of the part of the contents shown by the correspondence information, in place of reading the part of the contents stored in the storage location on the external recording medium,
when the one of the judger by the first judger and the judgment by the second judger is negative, reads the part of the contents stored in the storage location on the external recording medium, wherein the playback controller includes:
a playback error detector that detects a playback error during playback of the read alternative content stored in the storage location on the internal recording medium, and
when the playback error is detected during playback of the read alternative content stored in the storage location on the internal recording medium, rewrites a result of the detection so that the additional information indicates that the playback error is detected, and terminates the application program being executed.

2. The playback apparatus of claim 1, wherein when the judgment by the first judger and the judgment by the second judger are affirmative, the virtual package manager specifies the storage location on the internal recording medium of the alternative content as a data retrieve destination so as to read the alternative content.

3. The playback apparatus of claim 1, wherein each content includes a playlist indicating a playback order of the AV stream data included in the content, the alternative content includes a playlist indicating a playback order of the AV stream data included in the alternative content, and the playback controller plays back the AV stream data in accordance with the playback order indicated by the playlist included in the content to be played back.

4. The playback apparatus of claim 1, wherein
the alternative contents are sequentially updated,
the correspondence information includes information indicating a type of each of the updated alternative contents and an update timing,
the network manager sequentially obtains, from the external server, the updated alternative contents and the correspondence information of each of the updated alternative contents, and stores the correspondence information obtained sequentially in the internal recording medium, and
in the case when the judgment by the first judger and the judgment by the second judger are affirmative and there are at least two storage locations for the alternative content corresponding to the content being referred to, the virtual package manager specifies a storage location having a latest updating timing as the data retrieve destination so as to read the latest alternative content.

5. The playback apparatus of claim 2, wherein
the alternative contents are sequentially updated,
the correspondence information includes therein information indicating a type of each of the updated alternative contents and an update timing,
the network manager sequentially obtains, from the external server, the updated alternative contents and the correspondence information of each of the updated alternative contents, and stores the correspondence information obtained sequentially in the internal recording medium, and
the playback apparatus further comprising:
an adder that adds, in the correspondence information, normal operation information to each alternative content in which no playback error is detected, the normal operation information indicating the detection of no playback error and being associated with a storage location of the alternative content;
a selection list displayer that displays, in a case when a playback error is detected in a newly obtained alternative content, a list showing at least one storage location of an alternative content having (i) a same type as the newly obtained alternative content and (ii) the normal operation information added thereto, based on the correspondence information; and an instruction receptor that receives a selection instruction for selecting a storage location of the alternative content from the list, and in the case when the judgment by the first judger and the judgment by the second judger are affirmative and the content being referred to is a content replaced with the alternative content of the selection instruction, the virtual package manager specifies the storage location of the alternative data for the selection instruction as a data retrieve destination so as to read the alternative content of the selection instruction.

6. The playback apparatus of claim 2, wherein the contents are respectively different types, the alternative content is the same type as the content to be replaced, when the playback error detector detects the playback error, the application executor judges whether a content including the detected playback error is a content for playing back a selection menu which allows selection of contents of other types that are playback targets, and when the content including the detected playback error is not the content for playing back the selection menu, the application executor plays back the content for playing back the selection menu by executing the application program.

7. The playback apparatus of claim 1, wherein the application program generates graphics used for displaying animation.

8. A playback method used on a playback apparatus for playing back an AV stream data using an external recording medium that stores a plurality of contents each including the AV stream data, and an application program that refers to the AV stream data to play back the AV stream data in a predetermined playback order, wherein the playback apparatus includes an internal recording medium, and the playback method comprises:

selecting one of the plurality of contents;

executing an application program corresponding to the selected content;

playing back the AV stream data included in the content corresponding to the executed application program;

obtaining, from an external server including therein one or more alternative contents, (i) an alternative content to replace part of the contents and (ii) correspondence information showing a correspondence between a storage location where the internal recording medium of the alternative content is stored and a storage location where the external recording medium of the part of the contents to be replaced is stored, and storing the obtained alternative content and correspondence information in the internal recording medium;

judging, based on the correspondence information, whether or not the alternative content exists on the internal recording medium;

detecting whether there is an error in the alternative content, storing a detection result showing a result of the detection as additional information in the internal recording medium, and judging whether or not an error is detected in the alternative content in accordance with the detection result stored as the additional information;

reading, at a time when the application program is being executed, the AV stream data included in a content being referred to, the alternative content stored in the storage location on the internal recording medium corresponding to the storage location of the part of the contents shown by the correspondence information, in place of reading the part of the contents stored in the storage location on the external recording medium when a judgment by a first judger and a judgment by a second judger are affirmative, and reading the part of the contents stored in the storage location on the external recording medium when the one of the judgment by the first judger and the judgment by the second judger is negative;

detecting a playback error during playback of the read alternative content stored in the storage location on the internal recording medium; and rewriting a result of the detection so that the additional information indicates that the playback error is detected, and terminating the application program being executed when the playback error is detected during playback of the read alternative content stored in the storage location on the internal recording medium.

9. A non-transitory computer-readable recording medium that records a program for causing a play back apparatus, which plays back an AV stream data using an external recording medium that stores a plurality of contents, each including the AV stream data and an application program that refers to the AV stream data to play back the AV stream data in a predetermined playback order, to perform a playback process, wherein:

the playback apparatus includes an internal recording medium, and the playback process comprises:

selecting one of the plurality of contents;

executing an application program corresponding to the selected content;

playing back the AV stream data included in the content corresponding to the executed application program;

obtaining, from an external server including therein one or more alternative contents, (i) an alternative content to replace part of the contents and (ii) correspondence information showing a correspondence between a storage location where the internal recording medium of the alternative content is stored and a storage location where the external recording medium of the part of the contents to be replaced is stored, and storing the obtained alternative content and correspondence information in the internal recording medium;

judging, based on the correspondence information, whether or not the alternative content exists on the internal recording medium;

detecting whether there is an error in the alternative content, storing a detection result showing a result of the detection as additional information in the internal recording medium, and judging whether or not an error is detected in the alternative content in accordance with the detection result stored as the additional information;

reading, at a time when the application program being executed reads the AV stream data included in a content being referred to, the alternative content stored in the storage location on the internal recording medium corresponding to the storage location of the part of the contents shown by the correspondence information, in place of reading the part of the contents stored in the storage location on the external recording medium when a judgment by a first judger and a judgment by a second judger are affirmative, and reading the part of the contents stored in the storage location on the external recording medium when the one of the judgment by the first judger and the judgment by the second judger is negative;

detecting a playback error during playback of the read alternative content stored in the storage location on the internal recording medium; and rewriting a result of the detection so that the additional information indicates that the playback error is detected, and terminating the application program being executed when the playback error is detected during playback of the read alternative content stored in the storage location on the internal recording medium.

* * * * *